(12) United States Patent
Zhang et al.

(10) Patent No.: US 11,057,918 B2
(45) Date of Patent: Jul. 6, 2021

(54) ELECTRONIC DEVICE AND RADIO COMMUNICATION METHOD

(71) Applicant: Sony Corporation, Tokyo (JP)

(72) Inventors: Wenbo Zhang, Beijing (CN); Chen Sun, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/321,037

(22) PCT Filed: Jan. 16, 2018

(86) PCT No.: PCT/CN2018/072800
§ 371 (c)(1),
(2) Date: Jan. 28, 2019

(87) PCT Pub. No.: WO2018/171313
PCT Pub. Date: Sep. 27, 2018

(65) Prior Publication Data
US 2019/0166613 A1 May 30, 2019

(30) Foreign Application Priority Data

Mar. 24, 2017 (CN) .......................... 201710184563.4

(51) Int. Cl.
*H04W 72/12* (2009.01)
*H04W 72/04* (2009.01)
*H04W 88/04* (2009.01)

(52) U.S. Cl.
CPC ..... *H04W 72/1278* (2013.01); *H04W 72/042* (2013.01); *H04W 72/0453* (2013.01); *H04W 88/04* (2013.01)

(58) Field of Classification Search
CPC ........... H04W 72/042; H04W 72/0453; H04W 72/1278; H04W 88/04

(Continued)

(56) References Cited

U.S. PATENT DOCUMENTS

2015/0271807 A1 9/2015 Patil et al.
2016/0338094 A1 11/2016 Faurie et al.
(Continued)

FOREIGN PATENT DOCUMENTS

CN 104703224 A 6/2015
CN 106060947 A 10/2016
(Continued)

OTHER PUBLICATIONS

Chinese Office Action dated Jan. 7, 2021, issued in corresponding Chinese Patent Application No. 201880002096.1.
(Continued)

*Primary Examiner* — Huy D Vu
*Assistant Examiner* — Nizam U Ahmed
(74) *Attorney, Agent, or Firm* — Xsensus, LLP

(57) ABSTRACT

The present disclosure relates to an electronic device and a radio communication method. The electronic device according to the present disclosure comprises: a processing circuit configured to perform a semi-persistent scheduling (SPS) configuration on a remote device, with the remote device communicating with the electronic device by means of a relay device within a service range of the electronic device; and a transceiving circuit configured to send SPS configuration information about the remote device to the relay device. By means of the electronic device and the radio communication method according to the present disclosure, an SPS technology can be applied to communication between devices, so as to meet the service quality requirements of different services and flow types.

12 Claims, 12 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2016/0381666 A1* | 12/2016 | Kim | H04L 5/0055 |
| | | | 370/329 |
| 2017/0019887 A1 | 1/2017 | Jiang et al. | |
| 2017/0289733 A1* | 10/2017 | Rajagopal | H04W 4/70 |
| 2018/0132208 A1* | 5/2018 | Pan | H04W 72/0406 |
| 2018/0160418 A1 | 6/2018 | Luo et al. | |
| 2019/0014563 A1* | 1/2019 | Lee | H04W 74/04 |

FOREIGN PATENT DOCUMENTS

| | | |
|---|---|---|
| CN | 106063352 A | 10/2016 |
| CN | 106105367 A | 11/2016 |
| CN | 106211332 A | 12/2016 |
| CN | 107071916 A | 8/2017 |

OTHER PUBLICATIONS

International Search Report dated Mar. 27, 2018 for PCT/CN2018/072800 filed on Jan. 16, 2018, 10 pages including English translation.

\* cited by examiner

ELECTRONIC DEVICE AND RADIO COMMUNICATION METHOD

CROSS-REFERENCE TO RELATED APPLICATIONS

The present application is based on PCT filing PCT/CN2018/072,800, filed Jan. 16, 2018, and claims the priority to Chinese Patent Application No. 201710184563.4, titled "ELECTRONIC DEVICE AND RADIO COMMUNICATION METHOD", filed on Mar. 24, 2017 with the Chinese Patent Office, which is incorporated herein by reference in its entirety.

FIELD

Embodiments of the present disclosure generally relate to the field of wireless communications, and in particular to electronic equipments and wireless communication methods. More specifically, the present disclosure relates to an electronic equipment as a network side equipment, an electronic equipment as a relay equipment, an electronic equipment as a remote equipment, a wireless communication method performed by a network side equipment, a wireless communication method performed by a relay equipment, and a wireless communication method performed by a remote equipment.

BACKGROUND

In a Further enhanced Device to Device (FeD2D) communication system, a remote UE may communicate with a network side equipment (for example, a base station, including but not limited to an evolution node B (eNB)) via a relay UE. Specifically, the remote UE communicates with the relay UE via a sidelink or a non-3rd Generation Partnership Project (3GPP) link such as Bluetooth and Wireless Fidelity (Wifi), and the relay UE communicates with the network side equipment via a conventional cellular link.

In the above network architecture, when the remote UE performs services such as Voice over Internet Protocol (VoIP) and Streaming Services, the remote UE needs to request time-frequency resources from the network side equipment before performing service every time, resulting in a large delay and low reliability.

The above technical problems also exist in other communication systems including communication between devices, such as a Device to Device (D2D) communication system, a vehicle to X (V2X) communication system, and a communication system including a relay.

Therefore, it is desired to provide a technical solution, to improve the reliability of communication between devices and reduce the delay, thereby meeting Quality of Service (QoS) requirements of different services and traffic types.

SUMMARY

This section provides a general summary of the present disclosure, and is not a comprehensive disclosure of a full scope or all features of the present disclosure.

An object of the present disclosure is to provide an electronic equipment and a wireless communication method, to improve reliability of communication between devices and reduce delay, thereby meeting QoS requirements of different services and traffic types.

According to an aspect of the present disclosure, an electronic equipment is provided. The electronic equipment includes: a processing circuit configured to perform a Semi-Persistent Scheduling (SPS) configuration for a remote equipment, where the remote equipment communicates with the electronic equipment via a relay equipment within a service range of the electronic equipment; and a transceiver circuit configured to transmit SPS configuration information of the remote equipment to the relay equipment.

According to another aspect of the present disclosure, an electronic equipment is provided. The electronic equipment includes: a transceiver circuit configured to receive Semi-Persistent Scheduling SPS configuration information of a remote equipment from a network side equipment providing service for the electronic equipment, where the remote equipment communicates with the network side equipment via the electronic equipment; and a processing circuit configured to perform at least one of operations of: saving the SPS configuration information; and controlling the transceiver circuit to transmit the SPS configuration information to the remote equipment.

According to another aspect of the present disclosure, an electronic equipment is provided. The electronic equipment includes: a transceiver circuit configured to receive Semi-Persistent Scheduling SPS configuration information of the electronic equipment from a relay equipment, where the electronic equipment communicates with a network side equipment providing service for the relay equipment via the relay equipment; and a processing circuit is configured to save the SPS configuration information.

According to another aspect of the present disclosure, a wireless communication method performed by a network side equipment is provided. The wireless communication method includes: performing a Semi-Persistent Scheduling SPS configuration for a remote equipment, where the remote equipment communicates with the network side equipment via a relay equipment within a service range of the network side equipment; and transmitting SPS configuration information of the remote equipment to the relay equipment.

According to another aspect of the present disclosure, a wireless communication method performed by a relay equipment is provided. The wireless communication method includes: receiving Semi-Persistent Scheduling SPS configuration information of a remote equipment from a network side equipment providing service for the relay equipment, where the remote equipment communicates with the network side equipment via the relay equipment; and performing at least one of operations of: saving the SPS configuration information; and transmitting the SPS configuration information to the remote equipment.

According to another aspect of the present disclosure, a wireless communication method performed by a remote equipment is provided. The wireless communication method includes: receiving Semi-Persistent Scheduling SPS configuration information of the remote equipment from a relay equipment, the remote equipment communicating with a network side equipment providing service for the relay equipment via the relay equipment; and saving the SPS configuration information.

With the electronic equipments and the wireless communication methods provided in the present disclosure, the network side equipment can perform an SPS configuration for the remote equipment and transmit the SPS configuration of the remote equipment to the relay equipment. In this way, the remote equipment can acquire SPS configuration information for communication with the relay equipment, and thus fixed frequency resources can be periodically allocated to the remote equipment. Therefore, with the electronic equipments and the wireless communication methods provided in the present disclosure, reliability of communication between devices can be can improved, and delay can be reduced, thereby meeting QoS requirements of different services and traffic types.

Further applicability range is apparent from the description provided herein. The description and specific examples in the overview are merely for the purpose of illustration and are not intended to limit the scope of the present disclosure.

BRIEF DESCRIPTION OF THE DRAWINGS

The drawings described herein are provided merely for the purpose of illustrating the selected embodiments rather than all possible embodiments, and are not intended to limit the scope of the present disclosure. In the drawings.

Figure 1A:
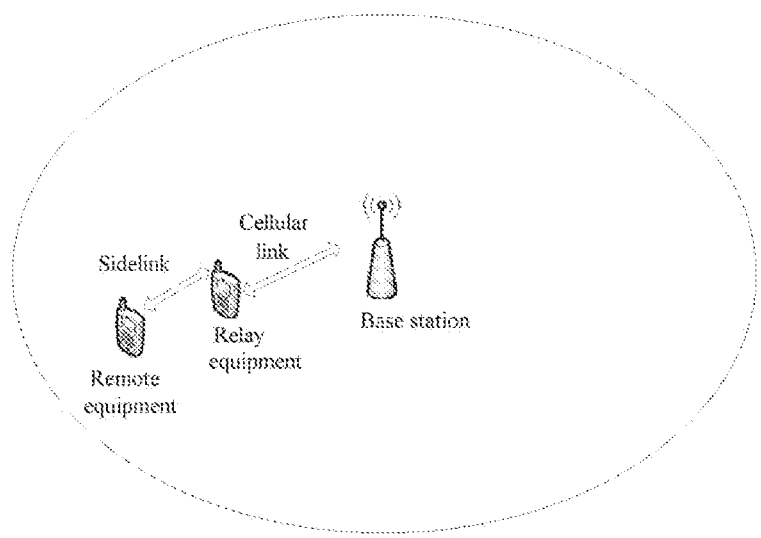
FIG. 1(a) is a schematic diagram showing an application scenario of the present disclosure.

While specific embodiments of the present disclosure are shown as examples in the drawings and are described here in detail, various modifications and variations may be made to the present disclosure. It should be understood that the description for the specific embodiments herein is not intended to limit the present disclosure to the disclosed specific forms, and the present disclosure is intended to encompass all modifications, equivalents and alternatives that fall within the spirit and scope of the present disclosure. It should be noted that reference numerals indicate parts corresponding to the reference numerals throughout the drawings.

DETAILED DESCRIPTION OF EMBODIMENTS

Examples of the present disclosure are described more fully with reference to the drawings. The following description is merely exemplary rather than being intended to limit the present disclosure and applications or purposes of the present disclosure.

Exemplary embodiments are provided to make the present disclosure be exhaustive and fully convey the scope of the present disclosure to those skilled in the art. Various specific details such as specific parts, devices and methods are set forth to provide thorough understanding for the embodiments of the present disclosure. It is apparent to those skilled in the art that the exemplary embodiments may be embodied in many different forms without the specific details, and the specific details are not interpreted as a limit for the scope of the present disclosure. In some exemplary embodiments, well-known processes, well-known structures and well-known technology are not described in detail.

The description will be made in the following order,
1. Application Scenarios
2. First Embodiment
3. Second Embodiment
4. Third Embodiment
5. Fourth Embodiment
6. Fifth Embodiment
7. Sixth Embodiment
8. Application Examples

1. APPLICATION SCENARIOS

FIG. 1(a) is a schematic diagram showing an application scenario of the present disclosure. As shown in FIG. 1(a), there are a relay equipment and a remote equipment in the coverage of a base station, and the remote equipment communicates with the base station providing service for the relay equipment via the relay equipment. Specifically, the remote equipment communicates with the relay equipment through a sidelink, and the relay equipment communicates with the base station through a cellular link.

Figure 1B:
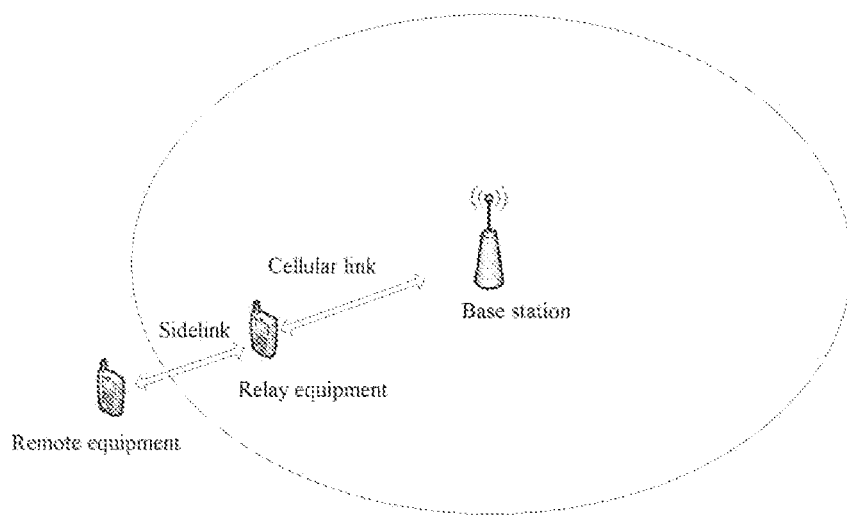
FIG. 1(b) is a schematic diagram showing another application scenario of the present disclosure.

FIG. 1(b) is a schematic diagram showing another application scenario of the present disclosure. As shown in FIG. 1(b), there is a relay equipment in the coverage of a base station, and the remote equipment is located outside the coverage of the base station. The remote equipment communicates with the base station providing service for the relay equipment via the relay equipment. Specifically, the remote equipment communicates with the relay equipment through a sidelink, and the relay equipment communicates with the base station through a cellular link. In FIGS. 1(a) and 1(b), the remote equipment may also communicate with the relay equipment through a non-3GPP link. In addition, FIGS. 1(a) and 1(b) only show the case that there is one relay equipment within the service range of the base station, and there may be multiple relay equipments within the service range of the base station. Further, FIGS. 1(a) and 1(h) only show the case that the relay equipment is connected to one remote equipment, and the relay equipment may also be connected to to multiple remote equipments. Each of the multiple remote equipments may communicate with the base station via the relay equipment.

FIGS. 1(a) and 1(b) show two exemplary scenarios of the present disclosure, and the application scenario of the present disclosure is not limited thereto. The technical solution of the present disclosure is applicable to all communication systems including inter-device communication, such as a D2D communication system, a V2X communication system, and a communication system including a relay.

2. FIRST EMBODIMENT

Figure 2:
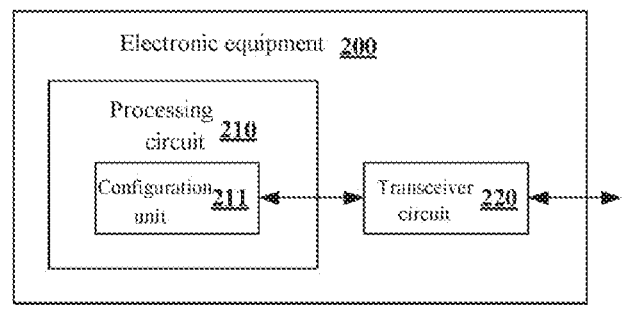
FIG. 2 is a block diagram showing a configuration example of an electronic equipment according to an embodiment of the present disclosure.

In this embodiment, a network side equipment according to an embodiment of the present disclosure will be described in detail. FIG. 2 is a block diagram showing a configuration example of an electronic equipment 200 according to an embodiment of the present disclosure. The electronic equipment 200 herein may be a network side equipment in a wireless communication network, such as the base stations shown in FIGS. 1(a) and 1(h), including but not limited to an eNB and a gNB (a node B in 5G).

As shown in FIG. 2, the electronic equipment 200 may include a processing circuit 210 and a transceiver circuit 220. It should be noted that the electronic equipment 200 may include one processing circuit 210 or multiple processing circuits 210.

Further, the processing circuit 210 may include various discrete functional units to perform various different functions and/or operations. It should be noted that the functional units may be physical entities or logical entities, and units referred to as different names may be implemented as a same physical entity.

According to the embodiment of the present disclosure, the processing circuit 210 may include a configuration unit 211.

According to the embodiment of the present disclosure, the configuration unit 211 may perform a SPS configuration for a remote equipment. The remote equipment herein communicates with the electronic equipment 200 via a relay equipment within a service range of the electronic equipment 200. For example, the base stations in FIGS. 1(a) and 1(b) may perform a SPS configuration for the remote equipment. That is, the configuration unit 211 may configure a SPS resource of the remote equipment. The SPS resource herein is used for communication between the remote equipment and the relay equipment, which is also referred to as a sidelink SPS.

According to the embodiment of the present disclosure, the transceiver circuit 220 may transmit SPS configuration information of the remote equipment to the relay equipment. The SPS configuration information includes the SPS configuration of the remote equipment, including a SPS index and a SPS period.

It can be seen from the embodiment of the present disclosure, the electronic equipment 200 as a network side equipment may perform a SPS configuration for a remote equipment connected with a relay equipment within the service range of the electronic equipment and transmit SPS configuration information of the remote equipment to the relay equipment. In this way, the remote equipment can acquire SPS configuration information for communication with the relay equipment, and thus fixed frequency resources can be periodically allocated to the remote equipment. That is, according to the embodiment of the present disclosure, the SPS technology can be applied to communication between terminal devices, thereby improving reliability of communication between devices and reducing delay, and thus meeting QoS requirements of different services and traffic types.

According to an embodiment of the present disclosure, the transceiver circuit 220 may transmit the SPS configuration information of the remote equipment to the relay equipment via high layer signaling.

According to an embodiment of the present disclosure, the high layer signaling may include Radio Resource Control (RRC) signaling. Specifically, the transceiver circuit 220 may carry the SPS configuration information of the remote equipment by using a SPS-Config cell in a RadioResourceConfigDedicated message.

According to an embodiment of the present disclosure, the processing circuit 210 (e.g., an identification information generating unit, which is not shown) may further be configured to generate identification information of the remote equipment to which the SPS configuration information is pertinent, and to include the identification information of the remote equipment in the SPS configuration information of the remote equipment. That is, the identification information added in the SPS configuration information may indicate that, the SPS configuration included in the SPS configuration information is a SPS configuration for the remote equipment corresponding to the identification information and is used for communication between the remote equipment corresponding to the identification information and the relay equipment. After the identification information of the remote equipment to which the SPS configuration information is pertinent is generated, the processing circuit 210 may include the identification information in the SPS configuration information, and the transceiver circuit 220 transmits the identification information together with the SPS configuration information to the relay equipment. That is, the SPS configuration information at least includes: an SPS configuration including information such as an SPS index and an SPS period, and identification information of the remote equipment to which the SPS configuration information is pertinent.

According to an embodiment of the present disclosure, the identification information of the remote equipment may include a Radio Network Tempory Identity (RNTI) of the remote equipment. The identification information may further include other identification information, which is not limited in the present disclosure. The identification information of the remote equipment may be identification information allocated by the electronic equipment 200 for the remote equipment.

In a non-limiting example of the present disclosure, the RNTI of the remote equipment may be indicated by "sl-R-SPS-RNTI", and signaling about "sl-R-SPS-RNTI" may be added to the high layer signaling, where "sl" represents a sidelink, "R" represents a remote equipment, and "sl-R-SPS-RNTI" represents an RNTI of the SPS for the sidelink, that is allocated by the electronic equipment 200 for the remote equipment. The above example is not limiting, and the RNTI of the remote equipment may be indicated by other parameters.

According to an embodiment of the present disclosure, after the electronic equipment 200 configures the SPS configuration for the remote equipment and generates the corresponding SPS configuration information, the electronic equipment 200 may transmit the SPS configuration information to the relay equipment. According to an embodiment of the present disclosure, the electronic equipment 200 may transmit the SPS configuration information of the remote equipment to the relay equipment in two manners.

First Configuration Manner

In a first manner of transmitting SPS configuration information, the processing circuit 210 (e.g., an indication information generating unit) may be configured to generate indication information for indicating whether a target terminal of the SPS configuration information of the remote equipment is the relay equipment, and the transceiver circuit 220 may further be configured to transmit the indication information to the relay equipment.

In the present disclosure, although the SPS configuration of the remote equipment is apt SPS configuration used for communication between the remote equipment and the relay equipment, the relay equipment also needs to save the SPS configuration of the remote equipment to extract identification information from the SPS configuration. The relay equipment may save the SPS configuration of the remote equipment in a high layer. Therefore, the target terminal of the SPS configuration information of the remote equipment transmitted by the network side equipment may be the relay equipment or the remote equipment.

According to an embodiment of the present disclosure, the processing circuit 210 may be configured to generate indication information for indicating a target terminal of the SPS configuration information of the remote equipment. For example, the processing circuit 210 may include the indication information in an adaptation layer. Specifically, the processing circuit 210 may further be configured to denote the indication information with one bit of information. For example, in a case that the indication information is "0", it is indicated that the target terminal of the SPS configuration information of the remote equipment is not the relay equipment but the remote equipment. In addition, in a case that the indication information is "1", it is indicated that the target terminal of the SPS configuration information of the remote equipment is the relay equipment.

According to an embodiment of the present disclosure, in a case that the target terminal of the SPS configuration information of the remote equipment is the remote equipment, the relay equipment directly forwards the SPS configuration information of the remote equipment to the remote equipment. That is, the relay equipment does not save the SPS configuration information of the remote equipment, and does not unpack (for example, unpack in a high layer) the SPS configuration information of the remote equipment but directly forwards the SPS configuration information of the remote equipment. In this case, the relay equipment cannot obtain the SPS configuration information of the remote equipment. Therefore, according to an embodiment of the present disclosure, the electronic equipment 200 may transmit the SPS configuration information of the remote equipment including the same content twice to the relay equipment, such that the target terminal of the SPS configuration information for one time is not the relay equipment, and the target terminal of the SPS configuration information for the other time is the relay equipment. According to an embodiment of the present disclosure, the SPS configuration information including the same content indicates that, the SPS configuration included in the SPS configuration information, i.e., information such as the SPS index and the SPS period is the same, and the identification information of the remote equipment included in the SPS configuration information is the same. In a case that the target terminal of the SPS configuration information of the remote equipment is the relay equipment, the relay equipment does not forward the SPS configuration information of the remote equipment to the remote equipment, but saves the SPS configuration information of the remote equipment. Herein, saving the SPS configuration information of the remote equipment includes: the relay equipment may unpack (for example, unpack in a high layer) the SPS configuration information of the remote equipment and extract the identification information of the remote equipment included in the SPS configuration information. According to the above embodiment of the present disclosure, the relay equipment can well distinguish the remote equipment connected thereto. That is, in a case that multiple remote equipments communicate with the network side equipment via a same relay equipment, the relay equipment may save the SPS configuration information of the multiple remote equipments to extract identification information of the multiple remote equipments respectively, so as to distinguish the multiple remote equipments from each other. According to an embodiment of the present disclosure, in a case that the relay equipment is only connected to one remote equipment, the electronic equipment 200 may transmit the SPS configuration information of the remote equipment once to the relay equipment, and the relay equipment forwards the SPS configuration information of the remote equipment to the remote equipment connected with the relay equipment.

Figure 3:
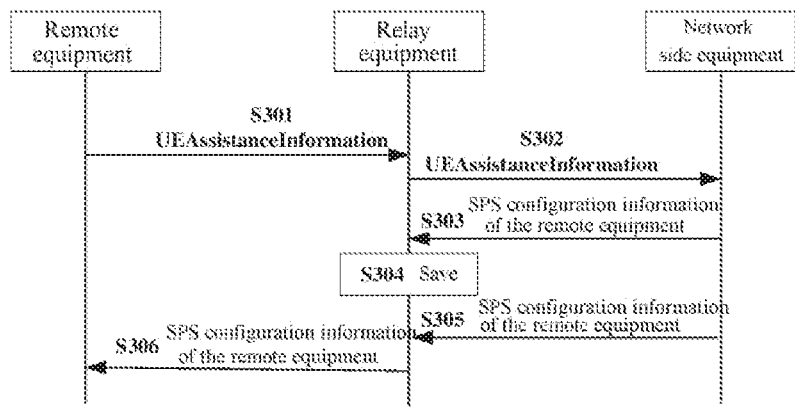
FIG. 3 is a signaling flowchart for performing a SPS configuration for a remote equipment according to an embodiment of the present disclosure.

FIG. 3 is a signaling flowchart for performing a SPS configuration for a remote equipment according to an embodiment of the present disclosure. A network side equipment shown in FIG. 3 may be implemented by the electronic equipment 200 provided in the present disclosure. As shown in FIG. 3, in step S301, a remote equipment transmits a UEAssistanceInformation message for indicating a desired period and the desired number of SPS configurations established for the remote equipment, to a relay equipment. Next, in step S302, the relay equipment forwards the UEAssistanceInformation message to the network side equipment. Next, in step S303, the network side equipment transmits SPS configuration information of the remote equipment to the relay equipment. In this step, the network side equipment may generate indication information for indicating that a target terminal of the SPS configuration information of the remote equipment is the relay equipment. Next, in step S304, the relay equipment saves the SPS configuration information of the remote equipment. Next, in step S305, the network side equipment transmits the SPS configuration information of the remote equipment to the relay equipment again, where the content of the SPS configuration information transmitted in this step may be the same as that of the SPS configuration information transmitted in step S303. In addition, in step S305, the network side equipment may generate indication information for indicating that the target terminal of the SPS configuration information of the remote equipment is not the relay equipment but the remote equipment. Next, in step S306, the relay equipment directly forwards the SPS configuration information of the remote equipment to the remote equipment.

As described above, a method for indicating a target terminal of a message transmitted by a network side equipment to a relay equipment is actually provided in the present disclosure. That is, the above indication information may indicate not only a target terminal of the SPS configuration information, but also a target terminal of an ordinary message. For example, the processing circuit 210 of the electronic equipment 200 may be configured to generate indication information for indicating whether a target terminal of a message transmitted by the electronic equipment 200 to the relay equipment is the relay equipment, and the transceiver circuit 220 may be configured to transmit the indication information to the relay equipment. The message transmitted by the electronic equipment 200 to the relay equipment may be transmitted via high layer signaling such as RRC signaling. Further, the electronic equipment 200 may denote the indication information with one bit of information. For example, in a case that the indication information is "0", it is indicated that the target terminal of the message is not the relay equipment but the remote equipment. In addition, in a case that the indication information is "1", it is indicated that the target terminal of the message is the relay equipment, which is similar to that of the SPS configuration information, and details thereof are not described herein again.

As described above, in the first manner of transmitting SPS configuration information provided in the present disclosure, the electronic equipment 200 may generate the indication information for indicating whether the target terminal of the SPS configuration information of the remote equipment is the relay equipment. The indication information may include one bit of information, and the network side equipment needs to transmit the SPS configuration information of the remote equipment twice to the relay equipment, with one being for the relay equipment saving the SPS configuration information of the remote equipment, and the other being for the remote equipment saving the SPS configuration information of the remote equipment, thereby implementing the SPS resource configuration for the remote equipment.

Second Configuration Manner

In a second manner of transmitting SPS configuration information, the processing circuit 210 may be configured to generate indication information for instructing the relay equipment to forward and save the SPS configuration information of the remote equipment, and the transceiver circuit 220 may further be configured to transmit the indication information to the relay equipment.

Similarly, the processing circuit 210 may include the indication information in an adaptation layer. Specifically, the processing circuit 210 may further be configured to denote the indication information with two bits of information. For example, in a case that the indication information is "10", it is indicated that the relay equipment forwards and saves the SPS configuration information of the remote equipment.

According to an embodiment of the present disclosure, when the relay equipment receives the indication information, the relay equipment saves the SPS configuration information of the remote equipment, including unpacking (for example, unpacking in a high layer) the SPS configuration of the remote equipment and extracting the identification information of the remote equipment. Further, the relay equipment may directly forward the SPS configuration information of the remote equipment to the remote equipment. The saving process and forwarding process in this manner are similar to those in the first manner.

According to an embodiment of the present disclosure, the processing circuit 210 may instruct the relay equipment to process other messages than the SPS configuration information of the remote equipment by using the above two bits of indication information. For example, in a case that the indication information is "00", the relay equipment is instructed to forward the message (for example, a message transmitted by the network side equipment to the remote equipment, where the specific content in the message does not need to be learned by the relay equipment) directly to the remote equipment, that is, the relay equipment does not save and unpack (for example, unpack in a high layer) the message. In a case that the indication information is "01", the relay equipment is instructed to save the message (for example, a message transmitted by the network side equipment to the relay equipment) locally, that is, the relay equipment unpacks (for example, unpacks in a high layer) the message but does not forward the message. In a case that the indication information is "10", the relay equipment is instructed to save the message (for example, the SPS configuration information of the remote equipment described above) locally and forward the message to the remote equipment. In addition, the indication information of "11" denotes reserved bits.

As described above, in the second manner, a method for instructing a relay equipment to process a message from the network side is actually provided in the present disclosure. That is, the processing circuit 210 may be configured to generate indication information for instructing the relay equipment to process a message from the electronic equipment 200, and the transceiver circuit 220 may transmit the indication information to the relay equipment. Further, the relay equipment may process the message from the electronic equipment 200 based on the indication information, including performing at least one of operations of: forwarding the message to the remote equipment; and saving the message. According to an embodiment of the present disclosure, the message from the electronic equipment 200 may be a message transmitted via high layer signaling such as RRC signaling.

Figure 4:
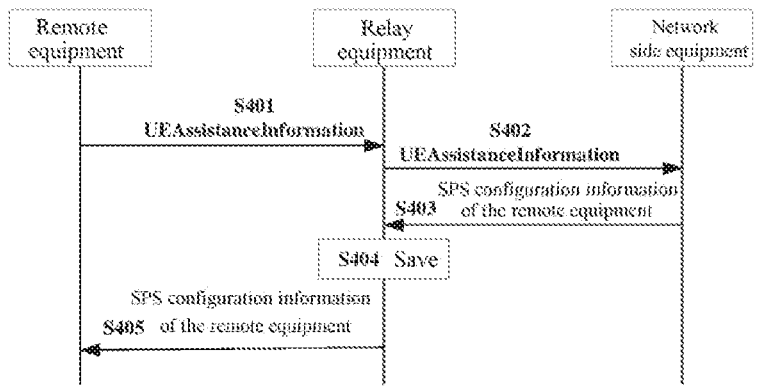
FIG. 4 is a signaling flowchart for performing a SPS configuration for a remote equipment according to another embodiment of the present disclosure.

FIG. 4 is a signaling flowchart for performing a SPS configuration for a remote equipment according to another embodiment of the present disclosure. A network side equipment shown in FIG. 4 may be implemented by the electronic equipment 200 provided in the present disclosure. As shown in FIG. 4, in step S401, a remote equipment transmits a UEAssistanceInformation message for indicating a desired period and the desired number of SPS configurations established for the remote equipment, to a relay equipment. Next, in step S402, the relay equipment forwards the UEAssistanceInformation message to the network side equipment. Next, in step S403, the network side equipment transmits SPS configuration information of the remote equipment to the relay equipment. In this step, the network side equipment may generate indication information for instructing the relay equipment to save and forward the SPS configuration information of the remote equipment. Next, in step S404, the relay equipment saves the SPS configuration information of the remote equipment, that is, the relay equipment unpacks (for example, unpacks in a high layer) the SPS configuration information. Next, in step S405, the relay equipment may forward the SPS configuration information to the remote equipment.

As described above, in the second manner of transmitting SPS configuration information provided in the present disclosure, the electronic equipment 200 may generate the indication information for instructing the relay equipment to forward and save the SPS configuration of the remote equipment. The indication information may include two bits of information, and the network side equipment needs to transmit the SPS configuration information of the remote equipment to the relay equipment only once, thereby implementing the SPS resource configuration for the remote equipment.

Implementations for performing a SPS configuration for a remote equipment are described in detail above. When the remote equipment receives the SPS configuration information, the remote equipment generally does not use the SPS configuration immediately, but uses the SPS configuration after receiving activation information for activating the SPS configuration.

According to an embodiment of the present disclosure, the processing circuit 210 (e.g., an activation information generating unit, which is not shown) may further be configured to generate activation information for activating the SPS configuration of the remote equipment, and the transceiver circuit 220 may further be configured to transmit the activation information to the relay equipment.

According to an embodiment of the present disclosure, the transceiver circuit 220 may further be configured to transmit the activation information to the relay equipment via low layer signaling. For example, the transceiver circuit 220 may transmit the activation information to the relay equipment via a Physical Downlink Control Channel (PDCCH). More specifically, the transceiver circuit 220 may transmit the activation information to the relay equipment by using Downlink Control Information (DCI).

According to an embodiment of the present disclosure, the processing circuit 210 may further be configured to generate the activation information by scrambling the DCI using the identification information of the remote equipment. Specifically, the DCI may be implemented in the format 5A. When the DCI format 5A is scrambled, functions of domains of the DCI format 5A are the same as those of a conventional DCI format 5A.

According to an embodiment of the present disclosure, the activation information may include resource indication information for SPS configuration and activation indication information for activating the SPS configuration.

According to an embodiment of the present disclosure, the electronic equipment 200 may further transmit release information for releasing the SPS configuration to the relay equipment. The release information may be transmitted in the same manner as the activation indication information. Therefore, all embodiments described in the present disclosure regarding the activation indication information are applicable to the release information. That is, the electronic equipment 200 may transmit the release information for the SPS configuration of the remote equipment to the relay equipment via low layer signaling in a manner similar to that of the activation indication information. In addition, the electronic equipment 200 may transmit the release information for the SPS configuration of the remote equipment to the relay equipment via high layer signaling such as RRC signaling.

In a non-limiting embodiment of the present disclosure, the resource indication information for the SPS configuration may be indicated by "sl SPS configuration index", and the activation/release indication information for activating/releasing the SPS configuration may be indicated by "Activation/release indication". Further, in a non-limiting embodiment of the present disclosure, the following signaling may be added in high layer signaling: "When the DCI format 5A is scrambled by using sl-R-SPS-RNTI, there are the following domains: sl SPS configuration index—3 bits, Activation/release indication-1 bit". The above examples are not limiting, the resource indication information for the SPS configuration and the activation indication information for activating the SPS configuration may be indicated by other parameters, and the above information may be indicated by other signaling.

According to an embodiment of the present disclosure, after the relay equipment receives the activation information, the relay equipment may forward the activation information to the remote equipment, which will be described in detail later.

According to an embodiment of the present disclosure, the processing circuit 210 may further be configured to generate confirmation information for confirming a target remote equipment of the activation information, and the transceiver circuit 220 may further be configured to transmit the confirmation information to the relay equipment. The electronic equipment 200 may transmit the confirmation information to the relay equipment, to cause the relay equipment to forward the confirmation information to the remote equipment. According to an embodiment of the present disclosure, the confirmation information includes activation indication information for activating the SPS configuration of the remote equipment. That is, the remote equipment activates the SPS configuration after receiving the confirmation information from the electronic equipment 200, i.e., begins to use resources in the SPS configuration.

According to an embodiment of the present disclosure, the processing circuit 210 may generate the confirmation information by using Media Access Control (MAC) Control Element (CE). Further, the processing circuit 210 may generate the confirmation information by using reserved bits (including but not limited to reserved bits "10111") in a logical channel identify (LCID) of a sub-header of a MAC Protocol Data Unit (PDU).

As described above, the electronic equipment 200 may transmit the activation information for activating the SPS configuration to the remote equipment via the relay equipment, and may transmit the confirmation information to the remote equipment via the relay equipment, so as to activate the SPS configuration of the remote equipment. In this way, the SPS technology can be applied to communication between terminal devices, thereby improving the reliability of the communication between devices and reducing the delay, and thus meeting QoS requirements of different services and traffic types.

3. SECOND EMBODIMENT

Figure 5:
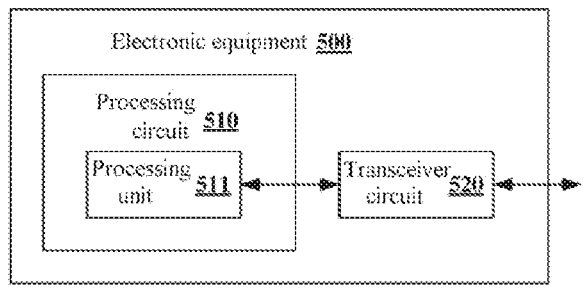
FIG. 5 is a block diagram showing a configuration example of an electronic equipment according to another embodiment of the present disclosure.

In this embodiment, an electronic equipment 500 according to an embodiment of the present disclosure will be described in detail. The electronic equipment 500 herein may be a relay equipment in a wireless communication system, such as the relay equipment shown in FIGS. 1(*a*) and 1(*b*). FIG. 5 is a block diagram showing a configuration example of an electronic equipment 500 according to an embodiment of the present disclosure.

As shown in FIG. 5, the electronic equipment 500 may include a processing circuit 510 and a transceiver circuit 520. It should be noted that the electronic equipment 500 may include one processing circuit 510 or multiple processing circuits 510.

Further, the processing circuit 510 may include various discrete functional units to perform various different functions and/or operations. It should be noted that the functional units may be physical entities or logical entities, and units referred to as different names may be implemented as a same physical entity.

According to the embodiment of the present disclosure, the processing circuit 510 may include a processing unit 511.

According to the embodiment of the present disclosure, the transceiver circuit 520 may receive SPS configuration information of a remote equipment from a network side equipment providing service for the electronic equipment 500, and the remote equipment communicates with the network side equipment via the electronic equipment 500. The network side equipment herein may be, for example, the electronic equipment 200 described in the first embodiment.

According to the embodiment of the present disclosure, the processing unit 511 in the processing circuit 510 may perform at least one of operations of: saving the SPS configuration information; and controlling the transceiver circuit 520 to transmit the SPS configuration information to the remote equipment.

As described above, the electronic equipment 500 according to the embodiment of the present disclosure may receive the SPS configuration information of the remote equipment from the network side equipment, and may save the SPS configuration information or forward the SPS configuration information to the remote equipment, thereby meeting the QoS requirements of different services and traffic types.

According to an embodiment of the present disclosure, the transceiver circuit 520 may be configured to receive the SPS configuration information of the remote equipment via high layer signaling such as the RRC signaling described above.

According to an embodiment of the present disclosure, the SPS configuration information may include identification information of the remote equipment to which the SPS configuration information is pertinent, such as the RNTI described above.

As described above, in the first manner of transmitting the SPS configuration information, according to an embodiment of the present disclosure, the transceiver circuit 520 may receive from the network side equipment, indication information for indicating whether a target terminal of the SPS configuration information is the electronic equipment 500. Further, the processing circuit 510 may save the SPS configuration information in a case that the indication information indicates that the target terminal of the SPS configuration information is the electronic equipment 500, and the processing circuit 510 may control the transceiver circuit 520 to transmit the SPS configuration information to the remote equipment in a case that the indication information indicates that the target terminal of the SPS configuration information is not the electronic equipment 500.

According to an embodiment of the present disclosure, the electronic equipment 500 may determine, based on local IDs in the adaptation layer, the remote equipment to which the SPS configuration information is pertinent, and then forward the SPS configuration information to the remote equipment.

As described above, in the second manner of transmitting the SPS configuration information, the transceiver circuit 520 may receive from the network side equipment, indication information for instructing the electronic equipment 500 to save and forward the SPS configuration information of the remote equipment. In the case that the indication information is received, the processing circuit 510 may save the SPS configuration information and control the transceiver circuit 520 to transmit the SPS configuration information to the remote equipment.

According to an embodiment of the present disclosure, the processing circuit 510 may unpack (for example, unpack in a high layer) the SPS configuration information when saving the SPS configuration information, thereby extracting the identification information of the remote equipment.

The two manners of transmitting the SPS configuration information according to the embodiments of the present disclosure has been described in detail in the description of the first embodiment, and details thereof are not described herein again. Several manners of activating the SPS configuration according to an embodiment of the present disclosure will be described in detail below.

According to an embodiment of the present disclosure, the transceiver circuit 520 may be configured to receive first activation information for activating the SPS configuration of the remote equipment from the network side equipment. As described above, the transceiver circuit 520 may further be configured to receive the first activation information from the network side equipment via low layer signaling. For example, the transceiver circuit 520 may receive the first activation information from the network side equipment via a Physical Downlink Control Channel (PDCCH). More specifically, the transceiver circuit 520 may receive the first activation information from the network side equipment by using Downlink Control Information (DCI).

According to an embodiment of the present disclosure, the first activation information may include resource indication information for SPS configuration and activation indication information for activating the SPS configuration. In addition, the first activation information is generated by the network side equipment by scrambling the DCI using the identification information of the remote equipment.

According to an embodiment of the present disclosure, the processing circuit 510 may descramble the first activation information using the identification information of the remote equipment. As described above, the electronic equipment 500 may save the SPS configuration of the remote equipment connected with the electronic equipment, so as to acquire the identification information of the remote equipment. In a case that the electronic equipment 500 is connected with multiple remote equipments, the electronic equipment 500 may acquire identification information of the multiple remote equipments. In addition, the electronic equipment 500 may acquire identification information of the electronic equipment 500. That is, the electronic equipment 500 may receive from the network side equipment, SPS configuration information for the communication between the electronic equipment 500 and the remote equipment and SPS configuration information for the communication between the electronic equipment 500 and the network side equipment. The SPS configuration information for the communication between the electronic equipment 500 and the remote equipment may include first identification information of the electronic equipment 500, and the SPS configuration information for the communication between the electronic equipment 500 and the network side equipment may include second identification information of the electronic equipment 500. After receiving the first activation information, the electronic equipment 500 may attempt to descramble the first activation information using the identification information of all the remote equipments and the identification information of the electronic equipment 500, thereby finding the identification information by which the first activation information can be correctly descrambled. In this way, the electronic equipment 500 can determine the remote equipment to which the first activation information is pertinent.

According to an embodiment of the present disclosure, the processing circuit 510 may generate second activation information for activating the SPS configuration of the remote equipment, and the transceiver circuit 520 may transmit the second activation information to the remote equipment.

The transceiver circuit 520 may transmit the second activation information to the remote equipment via high layer signaling. For example, the transceiver circuit 520 may transmit the second activation information to the remote equipment via RRC signaling. Specifically, after the electronic equipment 500 determines the remote equipment to which the first activation information is pertinent, the electronic equipment 500 may transmit the second activation information directly to the remote equipment via the RRC signaling. The second activation information may include resource indication information for SPS configuration of the remote equipment and activation indication information for activating the SPS configuration. Further, the transceiver circuit 520 may transmit the second activation information to the remote equipment via low layer signaling. According to an embodiment of the present disclosure, the transceiver circuit 520 may transmit the second activation information to the remote equipment via a Physical Sidelink Control Channel (PSCCH). The second activation information is transmitted via low layer signaling in the three activation manners below First Activation Manner In a first activation manner, the transceiver circuit 520 may transmit the second activation information to the remote equipment via low layer signaling such as PSCCH.

In addition, the processing circuit 510 may generate the second activation information by scrambling Sidelink Control Information (SCI) using the identification information of the remote equipment. Specifically, the SCI may be implemented in the format 2, which is newly defined in the present disclosure, to generate activation information transmitted by the electronic equipment 500 to the remote equipment. According to an embodiment of the present disclosure, when the SCI format 2 is scrambled using the first identification information of the electronic equipment 500, functions of domains of the SCI format 2 are the same as those of the conventional DCI format 5A. In this manner, when the remote equipment receives the second activation information, the SPS configuration can be activated if the second activation information can be correctly descrambled using the identification information of the remote equipment.

Figure 6:
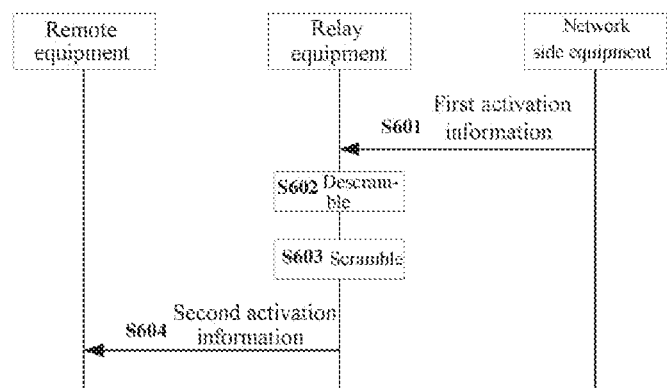
FIG. 6 is a signaling flowchart for activating a SPS configuration of a remote equipment according to an embodiment of the present disclosure.

FIG. 6 is a signaling flowchart showing a first activation manner in the present disclosure. A relay equipment shown in FIG. 6 may be implemented by the electronic equipment 500 according to the embodiment of the present disclosure, and a network side equipment shown in FIG. 6 may be implemented by the electronic equipment 200 according to the embodiment of the present disclosure.

As shown in FIG. 6, in step S601, the network side equipment transmits first activation information to the relay equipment, where the first activation information is scrambled using the identification information of the remote equipment. Next, in step S602, the relay equipment descrambles the first activation information using the acquired identification information of all remote equipments and the identification information of the relay equipment to determine the remote equipment to which the first activation information is pertinent. Next, in step S603, the relay equipment scrambles the SCI format 2 using the identification information of the remote equipment to generate second activation information. Next, in step S604, the relay equipment transmits the second activation information to the remote equipment.

As described above, in the first activation manner, the relay equipment may transmit the scrambled activation information to the remote equipment. In this embodiment, the second activation information may include resource indication information for SPS configuration of the remote equipment and activation indication information for activating the SPS configuration. When the remote equipment correctly descrambles the second activation information using the identification information of the remote equipment, the SPS configuration indicated by the resource indication information may be activated.

In a non-limiting embodiment of the present disclosure, the resource indication information for the SPS configuration may be indicated by "sl SPS configuration index", and the activation/release indication information for activating/releasing the SPS configuration may be indicated by "Activation/release indication". Further, in a non-limiting embodiment of the present disclosure, the following signaling may be added in high layer signaling: "When the SCI format 2 is scrambled by using sl-R-SPS-RNTI, there are the following domains: sl SPS configuration index—3 bits, Activation/release indication-1 bit". The above examples are not limiting, and the resource indication information for the SPS configuration and the activation indication information for activating the SPS configuration may be indicated by other parameters, and the above information may be indicated by other signaling.

Second Activation Manner

In a second activation manner, the transceiver circuit 520 may transmit the second activation information to the remote equipment via low layer signaling such as PSCCH.

The electronic equipment 500 does not scramble the second activation information, and directly transmits the second activation information that is not scrambled to the remote equipment. In this embodiment, the second activation information may include resource indication information for SPS configuration of the remote equipment, and does not include activation indication information for activating the SPS configuration of the remote equipment. Since the second activation information is not scrambled, the remote equipment cannot know whether the second activation information is pertinent to the remote equipment. Therefore, in this embodiment, the remote equipment needs to receive confirmation information for confirming a target remote equipment of the second activation information.

According to an embodiment of the present disclosure, the transceiver circuit 520 may receive confirmation information for confirming a target remote equipment of the second activation information from the network side equipment. The confirmation information includes activation indication information for activating the SPS configuration of the remote equipment. Further, the transceiver circuit 520 may forward the confirmation information to the remote equipment. In this way, the SPS configuration indicated in the second activation information can be activated only when the remote equipment receives the confirmation information which is pertinent to the remote equipment.

Figure 7:
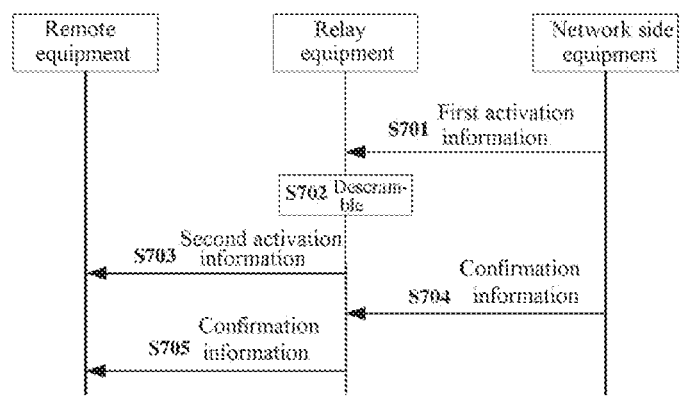
FIG. 7 is a signaling flowchart for activating a SPS configuration of a remote equipment according to another embodiment of the present disclosure.

FIG. 7 is a signaling flowchart showing a second activation manner in the present disclosure. A relay equipment shown in FIG. 7 may be implemented by the electronic equipment 500 according to the embodiment of the present disclosure, and a network side equipment shown in FIG. 7 may be implemented by the electronic equipment 200 according to the embodiment of the present disclosure.

As shown in FIG. 7, in step S701, the network side equipment transmits first activation information to the relay equipment, where the first activation information is scrambled using the identification information of the remote equipment. Next, in step S702, the relay equipment descrambles the first activation information using the acquired identification information of all remote equipments to determine the remote equipment to which the first activation information is pertinent. Next, in step S703, the relay equipment transmits second activation information that is not scrambled to the remote equipment. Next, in step S704, the network side equipment transmits confirmation information to the relay equipment. Next, in step S705, the relay equipment forwards the confirmation information to the remote equipment.

Third Activation Manner

In a third activation manner, the transceiver circuit 520 may transmit the second activation information to the remote equipment via low layer signaling such as PSCCH.

The electronic equipment 500 does not scramble the second activation information, and directly transmits the second activation information that is not scrambled to the remote equipment. Similarly, the second activation information may include resource indication information for SPS configuration of the remote equipment. According to an embodiment of the present disclosure, the processing circuit 510 (e.g., a confirmation information generating unit, which is not shown) may generate confirmation information for confirming a target remote equipment of the second activation information, and the transceiver circuit 520 may transmit the confirmation information to the remote equipment. In this way, the SPS configuration indicated in the second activation information can be activated only when the remote equipment receives the confirmation information which is pertinent to the remote equipment.

That is, the third activation manner differs from the second activation manner in that the confirmation information is generated by the relay equipment instead of the network side equipment. According to an embodiment of the present disclosure, the processing circuit 510 may generate the confirmation information by using the MAC CE. Further, the processing circuit 510 may generate the confirmation information by using reserved bits in the LCID of the subheader of the MAC PDU.

Figure 8:
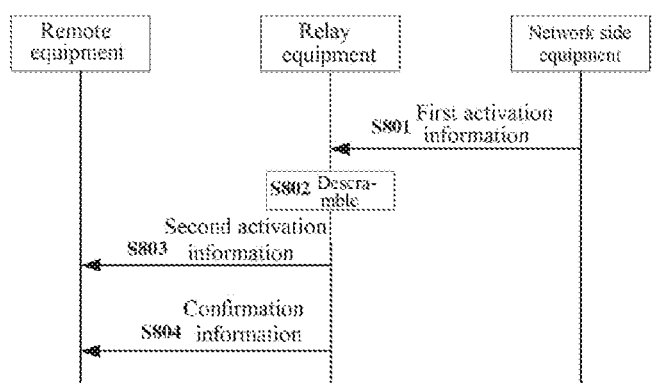
FIG. 8 is a signaling flowchart for activating a SPS configuration of a remote equipment according to another embodiment of the present disclosure.

FIG. 8 is a signaling flowchart showing a third activation manner in the present disclosure. A relay equipment shown in FIG. 8 may be implemented by the electronic equipment 500 according to the embodiment of the present disclosure, and a network side equipment shown in FIG. 8 may be implemented by the electronic equipment 200 according to the embodiment of the present disclosure.

As shown in FIG. 8, in step S801, the network side equipment transmits first activation information to the relay equipment, where the first activation information is scrambled using the identification information of the remote equipment. Next, in step S802, the relay equipment descrambles the first activation information using the acquired identification information of all remote equipments to determine the remote equipment to which the first activation information is pertinent. Next, in step S803, the relay equipment transmits second activation information that is not scrambled to the remote equipment. Next, in step S804, the relay equipment generates confirmation information and transmits the confirmation information to the remote equipment.

As described above, in the second and third activation manners, the relay equipment may transmit the second activation information that is not scrambled to the remote equipment. The second activation information may include resource indication information for SPS configuration of the remote equipment. Further, the network side equipment or the relay equipment may generate confirmation information for confirming a target remote equipment of the second activation information. The confirmation information may include activation indication information for activating the SPS configuration of the remote equipment. That is, the SPS configuration indicated in the second activation information can be activated only when the remote equipment receives the confirmation information which is pertinent to the remote equipment.

In the second and third activation manners, since the second activation information includes only the resource indication information for the SPS configuration of the remote equipment, in a non-limiting embodiment of the present disclosure, the added signaling includes only the "sl SPS configuration index—3 bits", but does not includes the "Activation/release indication-1 bit". The above example is not limiting, and the above information may be indicated by other signaling.

As described above, the electronic equipment 500 according to the embodiment of the present disclosure may forward the SPS configuration information and the SPS activation information to the remote equipment. In this way, the SPS technology can be applied to the communication between the terminal devices, thereby improving the reliability of the communication between the devices and reducing the latency, and thus meeting QoS requirements of different services and traffic types.

According to the embodiment of the present disclosure, the electronic equipment 500 may be located within the service range of the electronic equipment 200 as a network side equipment, and thus descriptions related to the electronic equipment 200 in the first embodiment are applicable in this embodiment.

4. THIRD EMBODIMENT

Figure 9:
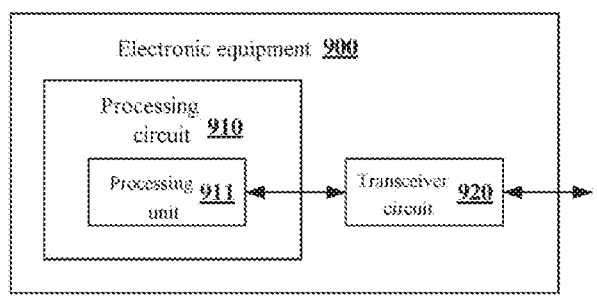
FIG. 9 is a block diagram showing a configuration example of an electronic equipment according to another embodiment of the present disclosure.

In this embodiment, an electronic equipment 900 according to an embodiment of the present disclosure will be described in detail. The electronic equipment 900 herein may be a remote equipment in a wireless communication system, such as the remote equipment shown in FIGS. 1(*a*) and 1(*b*). FIG. 9 is a block diagram showing a configuration example of an electronic equipment 900 according to an embodiment of the present disclosure.

As shown in FIG. 9, the electronic equipment 900 may include a processing circuit 910 and a transceiver circuit 920. It should be noted that the electronic equipment 900 may include one processing circuit 910 or multiple processing circuits 910.

Further, the processing circuit 910 may include various discrete functional units to perform various different functions and/or operations. It should be noted that the functional units may be physical entities or logical entities, and units referred to as different names may be implemented as a same physical entity.

According to the embodiment of the present disclosure, the processing circuit 910 may include a processing unit 911.

According to the embodiment of the present disclosure, the transceiver circuit 920 may receive SPS configuration information of the electronic equipment 900 from a relay equipment, and the electronic equipment 900 communicates with a network side equipment providing service for the relay equipment via the relay equipment. The relay equipment herein may be, for example, the electronic equipment 500 described in the second embodiment, and the network side equipment herein may be, for example, the electronic equipment 200 described in the first embodiment.

According to the embodiment of the present disclosure, the processing unit 911 in the processing circuit 920 may save the SPS configuration information.

According to an embodiment of the present disclosure, the transceiver circuit 920 may receive the SPS configuration information via high layer signaling. The high layer signaling may include RRC signaling.

According to an embodiment of the present disclosure, the SPS configuration information may include identification information of the electronic equipment 900, such as an RNTI. The process of saving the SPS configuration information by the processing unit 911 may include extracting the identification information in the SPS configuration information.

According to an embodiment of the present disclosure, the transceiver circuit 920 may receive activation information for activating the SPS configuration of the electronic equipment 900 from the relay equipment.

According to an embodiment of the present disclosure, the transceiver circuit 920 may receive the activation information for activating the SPS configuration of the electronic equipment 900 from the relay equipment via high layer signaling such as RRC signaling. The processing circuit 910 (e.g., an activation unit, which is not shown) may activate the SPS configuration after receiving the activation information transmitted by the relay equipment via the high layer signaling.

Further, the transceiver circuit 920 may receive the activation information for activating the SPS configuration of the electronic equipment 900 from the relay equipment via low layer signaling such as PSCCH.

In the first activation manner as described above, the activation information from the relay equipment is scrambled activation information. Therefore, according to an embodiment of the present disclosure, the processing circuit 910 (e.g., an activation unit, which is not shown) may activate the SPS configuration when descrambling the activation information using the identification information of the electronic equipment 900 correctly.

In the second and third activation manners as described above, the activation information from the relay equipment is not scrambled. Therefore, according to an embodiment of the present disclosure, the transceiver circuit 920 may receive confirmation information from the relay equipment or the network side equipment, and the processing circuit 910 (e.g., an activation unit, which is not shown) may activate the SPS configuration when the confirmation information indicates that a target equipment of the activation information is the electronic equipment 900.

According to an embodiment of the present disclosure, the relay equipment may provide service for one or more remote equipments. That is, one or more remote equipments may communicate with the network side equipment via one relay equipment. In the above description, the embodiments of the present disclosure have been described in the case of one remote equipment by an example. The descriptions above are also applicable in the case of multiple remote equipments.

Figure 10:
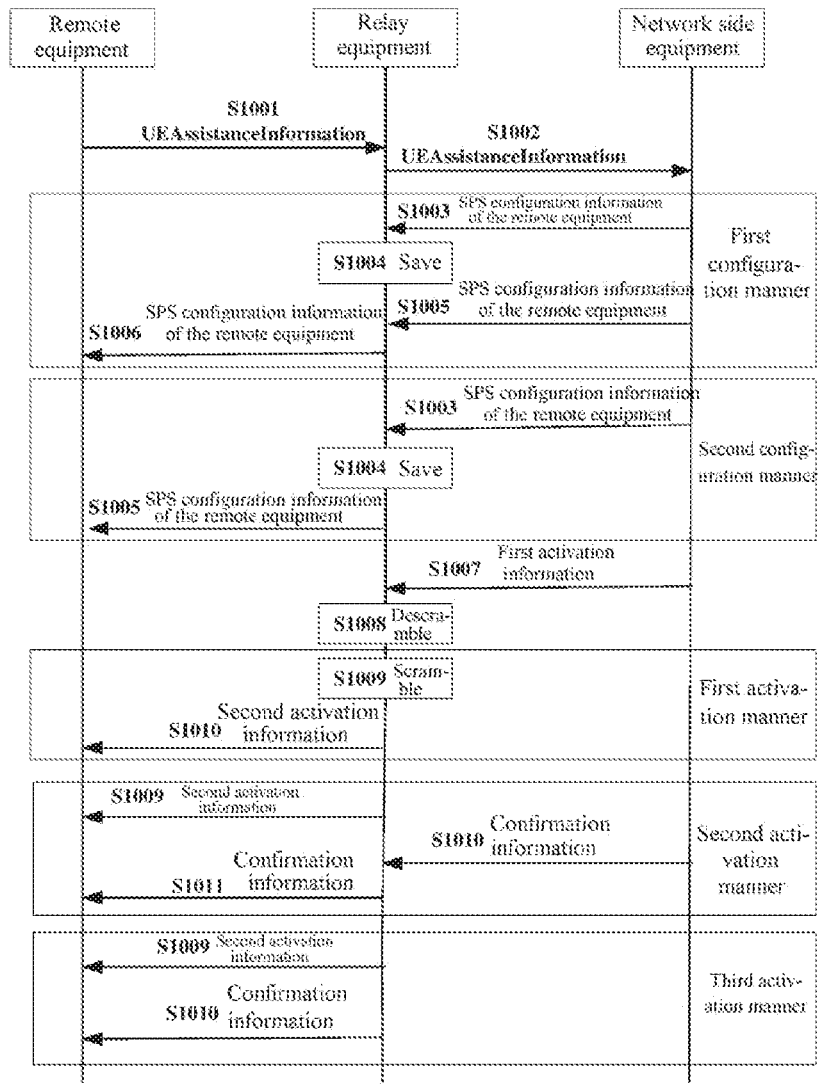
FIG. 10 is a signaling flowchart for performing a SPS configuration for a remote equipment and activating the SPS configuration according to an embodiment of the present disclosure.

FIG. 10 is a signaling flowchart for performing a SPS configuration for a remote equipment and activating the SPS configuration according to an embodiment of the present disclosure. As described above, the SPS configuration information may be transmitted in two manners, and the SPS configuration may be activated in three manners. In FIG. 10, the two configuration manners and the three activation manners are shown by dashed boxes. Therefore, in practical applications, one of the two configuration manners may be selected to perform SPS configuration, and one of the three activation manners may be selected to activate the SPS configuration. The details shown in FIG. 10 have been described above and will not be described again herein.

Figure 11:
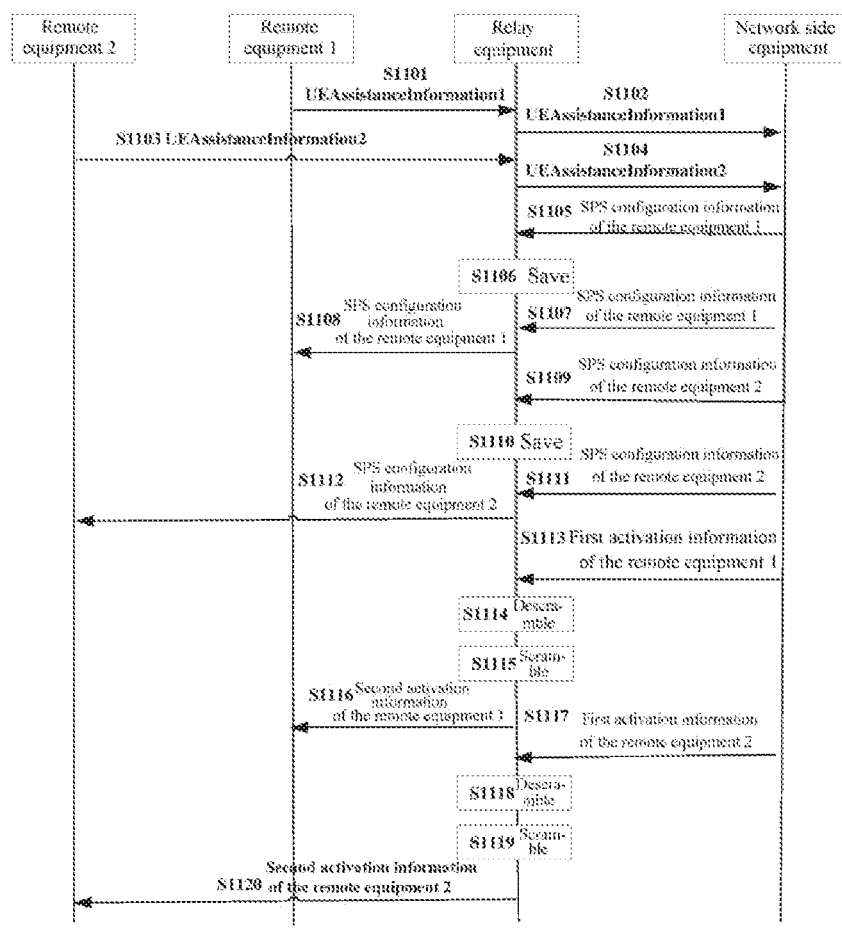
FIG. 11 is a signaling flowchart for performing SPS configurations for multiple remote equipments and activating the SPS configurations according to another embodiment of the present disclosure.

FIG. 11 is a signaling flowchart for performing SPS configurations for multiple remote equipments and activating the SPS configurations according to another embodiment of the present disclosure. FIG. 11 illustrates the case of multiple remote equipments by taking the first configuration manner and the first activation manner shown in FIG. 10 as an example. It should be noted that in the case of multiple remote equipments, the second configuration manner and the second and third activation manners may be selected. As shown in FIG. 11, a remote equipment 1 and a remote equipment 2 respectively transmit information UEAssistanceInformation to a network side equipment via a relay equipment. For the purpose of distinguishing, the information UEAssistanceInformation from the remote equipment 1 is identified as UEAssistanceInformation1, and the information UEAssistanceInformation from the remote equipment 2 is identified as UEAssistanceInformation2. Next, the network side equipment transmits SPS configuration information to the remote equipment 1 and the remote equipment 2 via, the relay equipment, respectively. Next, the network side equipment transmits activation information for activating the SPS configuration to the remote equipment 1 and the remote equipment 2 via the relay equipment, respectively. Further, according to an embodiment of the present disclosure, in a case that one relay equipment serves more than three remote equipments, processing may be performed in a manner similar to that in FIG. 11.

As described above, the electronic equipment 900 according to the embodiment of the present disclosure may receive the SPS configuration information from the network side equipment, and may receive the activation information for activating the SPS configuration and the confirmation information from the network side equipment or the relay equipment, so as to activate the SPS configuration. In this way, the SPS technology can be applied to the communication between the terminal devices, thereby improving the reliability of the communication between the devices and reducing the latency, and thus meeting QoS requirements of different services and traffic types.

According to the embodiment of the present disclosure, the electronic equipment 900 may communicate with the electronic equipment 200 as a network side equipment via the electronic equipment 500 as a relay equipment, and thus descriptions related to the electronic equipment 200 in the first embodiment and the electronic equipment 500 in the second embodiment 500 are applicable in this embodiment.

5. FOURTH EMBODIMENT

Next, a wireless communication method performed by a network side equipment provided in the present disclosure Skill be described in detail. The network side equipment herein may be the electronic equipment 200 in the first embodiment, and thus descriptions related to the electronic equipment 200 in the first embodiment are applicable in this embodiment.

Figure 12:
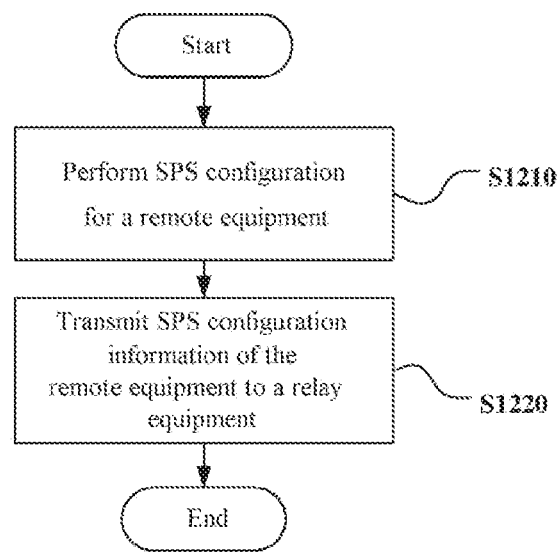
FIG. 12 is a flowchart showing a wireless communication method performed by a network side equipment according to an embodiment of the present disclosure.

FIG. 12 is a flowchart showing a wireless communication method performed by a network side equipment according to an embodiment of the present disclosure.

As shown in FIG. 12, in step S1210, SPS configuration is performed for a remote equipment. The remote equipment communicates with a network side equipment via a relay equipment within a service range of the network side equipment.

Next, in step S1220, SPS configuration information of the remote equipment is transmitted to the relay equipment.

Preferably, the SPS configuration information of the remote equipment is transmitted to the relay equipment via high layer signaling.

Preferably, the method further includes: generating identification information of the remote equipment to which the SPS configuration information is pertinent; and including the identification information of the remote equipment in the SPS configuration information of the remote equipment.

Preferably, the method further includes: generating indication information for indicating whether a target terminal of the SPS configuration information of the remote equipment is the relay equipment; and transmitting the indication information to the relay equipment.

Preferably, the method further includes: generating indication information for instructing the relay equipment to forward and save the SPS configuration information of the remote equipment.

Preferably, the method further includes: generating activation information for activating the SPS configuration of the remote equipment; and transmitting the activation information to the relay equipment.

Preferably, the activation information is transmitted to the relay equipment via low layer signaling.

Preferably, the activation information is generated by scrambling downlink control information DCI using the identification information of the remote equipment.

Preferably, the method further includes: generating confirmation information for confirming a target remote equipment of the activation information; and transmitting the confirmation information to the relay equipment.

The wireless communication method performed by a network side equipment according to the embodiment of the present disclosure has been described in detail when describing the first embodiment, and details thereof are not described herein again.

6. FIFTH EMBODIMENT

Next, a wireless communication method performed by a relay equipment provided in the present disclosure will be described in detail. The relay equipment herein may be the electronic equipment 500 in the second embodiment, and thus descriptions related to the electronic equipment 500 in the second embodiment are applicable in this embodiment.

Figure 13:
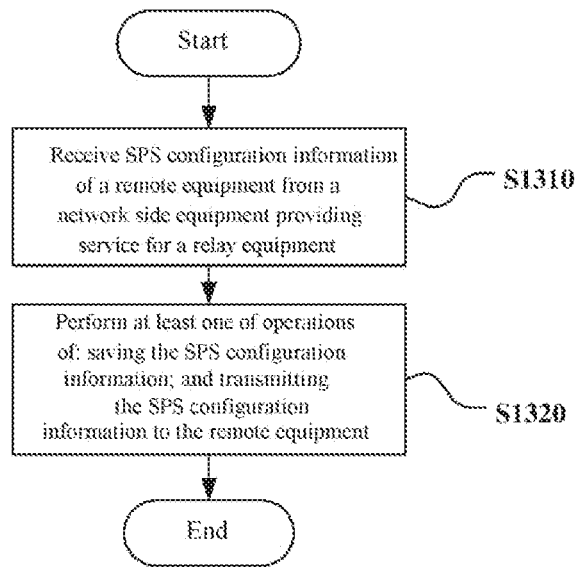
FIG. 13 is a flowchart showing a wireless communication method performed by a relay equipment according to an embodiment of the present disclosure.

FIG. 13 is a flowchart showing a wireless communication method performed by a relay equipment according to an embodiment of the present disclosure.

As shown in FIG. 13, in step S1310, SPS configuration information of a remote equipment is received from a network side equipment providing service for a relay equipment. The remote equipment communicates with the network side equipment via the relay equipment.

Next, in step S1320, at least one of the following operations is performed: saving the SPS configuration information; and transmitting the SPS configuration information to the remote equipment.

Preferably, the SPS configuration information of the remote equipment is received via high layer signaling.

Preferably, the SPS configuration information includes identification information of the remote equipment to which the SPS configuration information is pertinent.

Preferably, the method further includes: receiving, from the network side equipment, indication information for indicating whether a target terminal of the SPS configuration information is the relay equipment.

Preferably, the method further includes: saving the SPS configuration information in a case that the indication information indicates that the target terminal of the SPS configuration information is the relay equipment.

Preferably, the method further includes: transmitting the SPS configuration information to the remote equipment in a case that the indication information indicates that the target terminal of the SPS configuration information is not the relay equipment.

Preferably, the method further includes: receiving, from the network side equipment, indication information for instructing the relay equipment to save and forward the SPS configuration information of the remote equipment.

Preferably, the method further includes: saving the SPS configuration information, and transmitting the SPS configuration information to the remote equipment.

Preferably, the method further includes: receiving, from the network side equipment, first activation information for activating the SPS configuration of the remote equipment.

Preferably, the first activation information is received via low layer signaling.

Preferably, the first activation information is descrambled using the identification information of the remote equipment.

Preferably, the method further includes: generating second activation information for activating the SPS configuration of the remote equipment; and transmitting the second activation information to the remote equipment.

Preferably, the second activation information is transmitted to the remote equipment via low layer signaling.

Preferably, the method further includes: generating the second activation information by scrambling Sidelink Control Information SCI using the identification information of the remote equipment.

Preferably, the method further includes: generating confirmation information for confirming a target remote equipment of the second activation information; and transmitting the confirmation information to the remote equipment.

The wireless communication method performed by a relay equipment according to the embodiment of the present disclosure has been described in detail when describing the second embodiment, and details thereof are not described herein again.

7. SIXTH EMBODIMENT

Next, a wireless communication method performed by a remote equipment provided in the present disclosure will be described in detail. The remote equipment herein may be the electronic equipment 900 in the third embodiment, and thus descriptions related to the electronic equipment 900 in the third embodiment are applicable in this embodiment.

Figure 14:
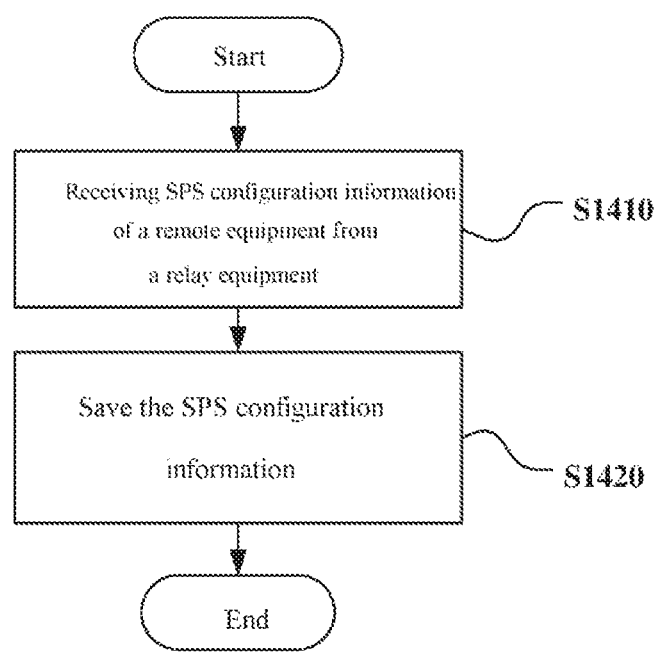
FIG. 14 is a flowchart showing a wireless communication method performed by a remote equipment according to an embodiment of the present disclosure.

FIG. 14 is a flowchart showing a wireless communication method performed by a remote equipment according to an embodiment of the present disclosure.

As shown in FIG. 14, in step S1410, SPS configuration information of a remote equipment is received from a relay equipment. The remote equipment communicates with a network side equipment providing service for the relay equipment via the relay equipment.

Next, in step S1420, the SPS configuration information is saved.

Preferably, the SPS configuration information is received via high layer signaling.

Preferably, the SPS configuration information includes identification information of the remote equipment.

Preferably, the method further includes: receiving, from the relay equipment, activation information for activating the SPS configuration of the remote equipment.

Preferably, the method further includes: activating the SPS configuration when descrambling the activation information using the identification information of the remote equipment correctly.

Preferably, the method further includes: receiving confirmation information from the relay equipment or the network side equipment; and activating the SPS configuration when the confirmation information indicates that a target equipment of the activation information is the remote equipment.

The wireless communication method performed by a remote equipment according to the embodiment of the present disclosure has been described in detail when describing the third embodiment, and details thereof are not described herein again.

8. Application Examples

The technology of the present disclosure can be applied to various products. For example, the network side equipment can be implemented as a base station. The base station may be implemented as any type of eNB, such as a macro eNB and a small eNB. The base station may further be implemented as any type of gNB. The small eNB may be an eNB covering a cell smaller than a macro cell, such as a pico eNB, a micro eNB or a home (femto) eNB. Alternatively, the base station may be implemented as any other type of base station, such as a NodeB and a base transceiver station (BTS). The base station may include: a main body (also referred to as a base station device) configured to control wireless communication; and one or more remote radio heads (RRH) arranged at positions different from the main body. In addition, various types of terminals described below may operate as a base station by performing functions of the base station temporarily or in a semi-persistent manner.

The terminal device as a relay equipment and a remote equipment may be implemented as mobile terminals (such as a smart phone, a tablet personal computer (PC), a notebook PC, a portable game terminal, a portable/dongle mobile router and a digital camera) or a vehicle terminal (such as a car navigation apparatus). In addition, the terminal device may be a wireless communication module (such as an integrated circuit module including a single chip) installed on each of the above terminals.

8-1. Application Example on Base Station

First Application Example

Figure 15:
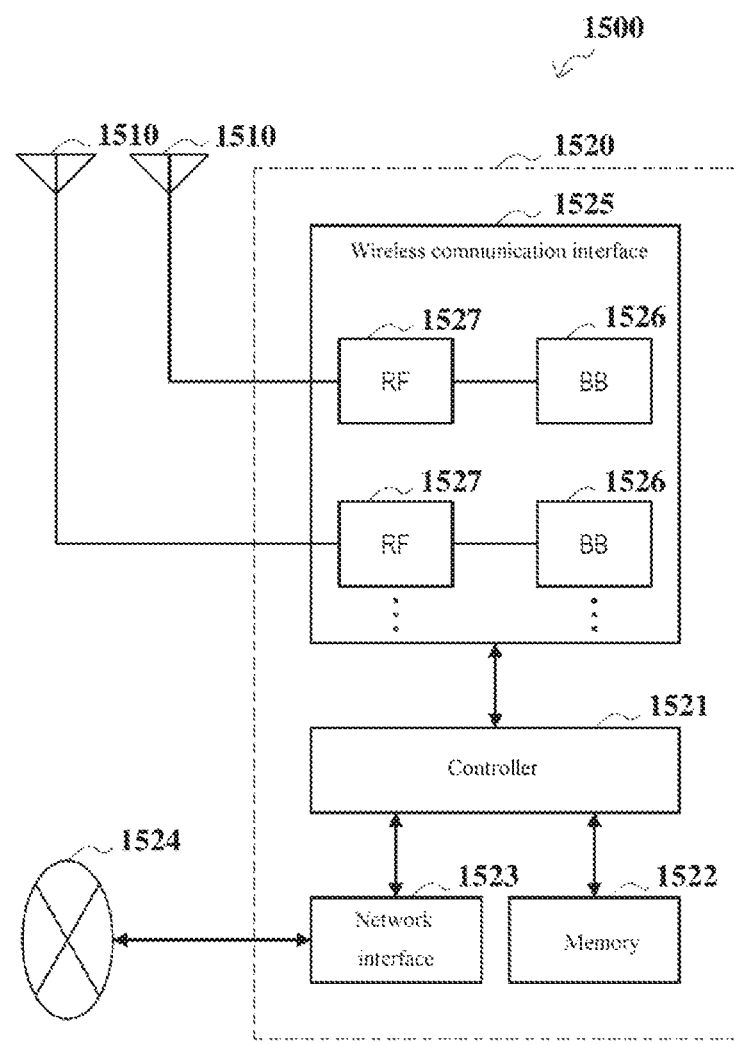
FIG. 15 is a block diagram showing a first schematic configuration example of an eNB.

FIG. 15 is a block diagram showing a first schematic configuration example of an eNB to which the technology of the present disclosure may be applied. An eNB 1500 includes one or more antennas 1510 and a base station device 1520. The base station device 1520 and each antenna 1510 may be connected to each other via an RF cable.

Each of the antennas 1510 includes a single or multiple antenna elements (such as multiple antenna elements included in a multi-input multi-output (MIMO) antenna), and is used for the base station device 1520 to transmit and receive wireless signals. As shown in FIG. 15, the eNB 1500 may include the multiple antennas 1510. For example, the multiple antennas 1510 may be compatible with multiple frequency bands used by the eNB 1500. Although FIG. 15 shows the example in which the eNB 1500 includes the multiple antennas 1510, the eNB 1500 may also include a single antenna 1510.

The base station device 1520 includes a controller 1521, a memory 1522, a network interface 1523, and a wireless communication interface 1525.

The controller 1521 may be, for example, a CPU or a DSP, and operates various functions of a higher layer of the base station device 1520. For example, the controller 1521 generates a data packet from data in signals processed by the wireless communication interface 1525, and transfers the generated packet via the network interface 1523. The controller 1521 may bundle data from multiple base band processors to generate the bundled packet, and transfer the generated bundled packet. The controller 1521 may have logical functions of performing control such as radio resource control, radio bearer control, mobility management, admission control and scheduling. The control may be performed in corporation with an eNB or a core network node in the vicinity. The memory 1522 includes a RAM and a ROM, and stores a program executed by the controller 1521, and various types of control data (such as a terminal list, transmission power data, and scheduling data).

The network interface 1523 is a communication interface for connecting the base station device 1520 to a core network 1524. The controller 1521 may communicate with a core network node or another eNB via the network interface 1523. In this case, the eNB 1500, and the core network node or the other eNB may be connected to each other via a logical interface (such as an S1 interface and an X2 interface). The network interface 1523 may also be a wired communication interface or a wireless communication interface for wireless backhaul. If the network interface 1523 is a wireless communication interface, the network interface 1523 may use a higher frequency band for wireless communication than a frequency band used by the wireless communication interface 1525.

The wireless communication interface 1525 supports any cellular communication scheme (such as Long Term Evolution (LTE) and LTE-Advanced), and provides wireless connection to a terminal positioned in a cell of the eNB 1500 via the antenna 1510. The wireless communication interface 1525 may typically include, for example, a baseband (BB) processor 1526 and an RF circuit 1527. The BB processor 1526 may perform, for example, encoding/decoding, modulating/demodulating, and multiplexing/demultiplexing, and performs various types of signal processing of layers (such as Li, medium access control (MAC), wireless link control (RLC), and a packet data convergence protocol (PDCP)). The BB processor 1526 may have a part or all of the above-described logical functions instead of the controller 1521. The BB processor 1526 may be a memory that stores a communication control program, or a module that includes a processor and a related circuit configured to execute the program. Updating the program may allow the functions of the BB processor 1526 to be changed. The module may be a card or a blade that is inserted into a slot of the base station device 1520. Alternatively, the module may also be a chip that is mounted on the card or the blade. Meanwhile, the RF circuit 1527 may include, for example, a mixer, a filter, and an amplifier, and transmits and receives wireless signals via the antenna 1510.

As shown in FIG. 15, the wireless communication interface 1525 may include the multiple 13B processors 1526. For example, the multiple BB processors 1526 may be compatible with multiple frequency bands used by the eNB 1500. As shown in FIG. 15, the wireless communication interface 1525 may include the multiple RF circuits 1527. For example, the multiple RF circuits 1527 may be compatible with multiple antenna elements. Although FIG. 15 shows the example in which the wireless communication interface 1525 includes the multiple BB processors 1526 and the multiple RF circuits 1527, the wireless communication interface 1525 may also include a single BB processor 1526 or a single RF circuit 1527.

Second Application Example

Figure 16:
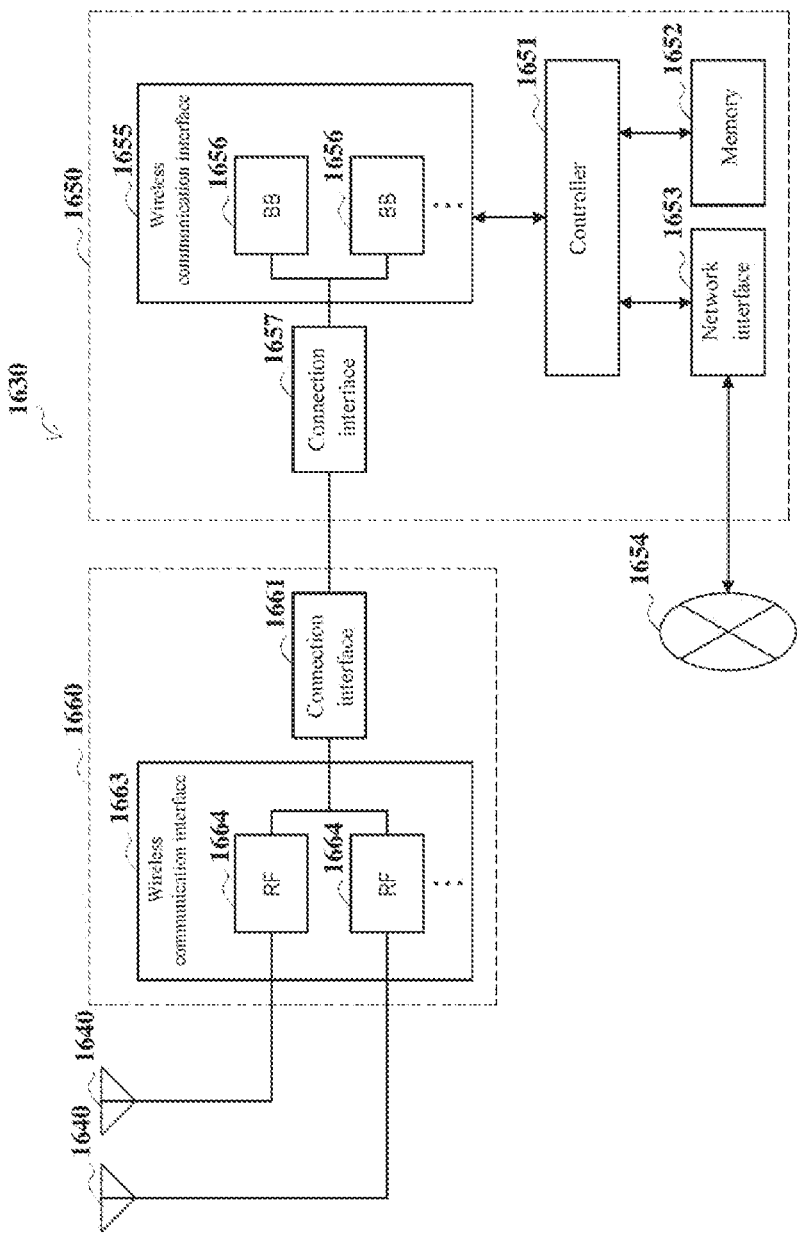
FIG. 16 is a block diagram showing a second schematic configuration example of an eNB.

FIG. 16 is a block diagram showing a second schematic configuration example of an eNB to which the technology of the present disclosure may be applied. An eNB 1630 includes one or more antennas 1640, a base station device 1650, and an RRH 1660. The RRH 1660 and each antenna 1640 may be connected to each other via an RF cable. The base station device 1650 and the RRH 1660 may be connected to each other via a high speed line such as an optical fiber cable.

Each of the antennas 1640 includes a single or multiple antenna elements (such as multiple antenna elements included in an MIMO antenna), and is used for the RRH 1660 to transmit and receive wireless signals. As shown in FIG. 16, the eNB 1630 may include the multiple antennas 1640. For example, the multiple antennas 1640 may be compatible with multiple frequency bands used by the eNB 1630. Although FIG. 16 shows the example in which the eNB 1630 includes the multiple antennas 1640, the eNB 1630 may also include a single antenna 1640.

The base station device 1650 includes a controller 1651, a memory 1652, a network interface 1653, a wireless communication interface 1655, and a connection interface 1657. The controller 1651, the memory 1652, and the network interface 1653 are the same as the controller 1521, the memory 1522, and the network interface 1523 described with reference to FIG. 15.

The wireless communication interface 1655 supports any cellular communication scheme (such as LTE and LTE-Advanced), and provides wireless communication to a terminal positioned in a sector corresponding to the RRH 1660 via the RRH 1660 and the antenna 1640. The wireless communication interface 1655 may typically include, for example, a BB processor 1656. The BB processor 1656 is the same as the BB processor 1526 described with reference to FIG. 15, except the BB processor 1656 is connected to an RF circuit 1664 of the RRH 1660 via the connection interface 1657. As shown in FIG. 16, the wireless communication interface 1655 may include the multiple BB processors 1656. For example, the multiple BB processors 1656 may be compatible with multiple frequency bands used by the eNB 1630. Although FIG. 16 shows the example in which the wireless communication interface 1655 includes the multiple BB processors 1656, the wireless communication interface 1655 may also include a single BB processor 1656.

The connection interface 1657 is an interface for connecting the base station device 1650 (wireless communication interface 1655) to the RRH 1660. The connection interface 1657 may also be a communication module for communication in the above-described high speed line that connects the base station device 1650 (wireless communication interface 1655) to the RRH 1660.

The RRH 1660 includes a connection interface 1661 and a wireless communication interface 1663.

The connection interface 1661 is an interface for connecting the RRH 1660 (wireless communication interface 1663) to the base station device 1650. The connection interface 1661 may also be a communication module for communication in the above-described high speed line.

The wireless communication interface 1663 transmits and receives wireless signals via the antenna 1640. The wireless communication interface 1663 may typically include, for example, the RF circuit 1664. The RF circuit 1664 may include, for example, a mixer, a filter, and an amplifier, and transmits and receives wireless signals via the antenna 1640. As shown in FIG. 16, the wireless communication interface 1663 may include multiple RF circuits 1664. For example, the multiple RF circuits 1664 may support multiple antenna elements. Although FIG. 16 shows the example in which the wireless communication interface 1663 includes the multiple RF circuits 1664, the wireless communication interface 1663 may also include a single RF circuit 1664.

In the eNB 1500 and the eNB 1630 shown in FIGS. 15 and 16, the processing circuit 210 described with reference to FIG. 2 may be implemented by the controller 1521 and/or the controller 1651. At least a part of functions may be implemented by the controller 1521 and the controller 1651. For example, the controller 1521 and/or the controller 1651 may perform a SFS configuration by executing instructions stored in the memory.

8-2. Application Example on Terminal Device

First Application Example

Figure 17:
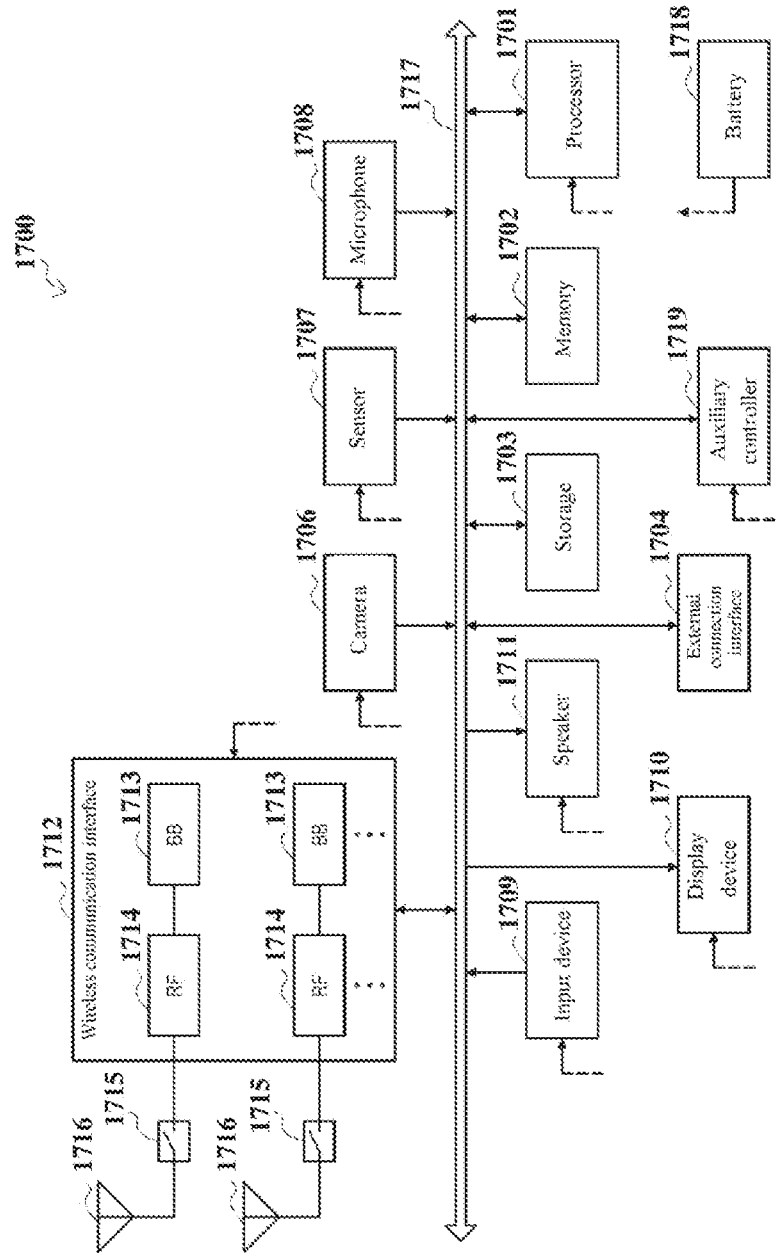
FIG. 17 is a block diagram showing a schematic configuration example of a smart phone.

FIG. 17 is a block diagram showing a schematic configuration example of a smart phone 1700 to which the technology of the present disclosure may be applied. The smart phone 1700 includes a processor 1701, a memory 1702, a storage 1703, an external connection interface 1704, a camera 1706, a sensor 1707, a microphone 1708, an input device 1709, a display device 1710, a speaker 1711, a wireless communication interface 1712, one or more antenna switches 1715, one or more antennas 1716, a bus 1717, a battery 1718, and an auxiliary controller 1719.

The processor 1701 may be, for example, a CPU or a system on a chip (SoC), and controls functions of an application layer and another layer of the smart phone 1700. The memory 1702 includes a RAM and a ROM, and stores a program executed by the processor 1701 and data. The storage 1703 may include a storage medium such as a semiconductor memory and a hard disk. The external connection interface 1704 is an interface for connecting an external apparatus (such as a memory card and a universal serial bus (USB) apparatus) to the smart phone 1700.

The camera 1706 includes an image sensor (such as a charge coupled device (CCD) and a complementary metal oxide semiconductor (CMOS)), and generates a captured image. The sensor 1707 may include a group of sensors such as a measurement sensor, a gyro sensor, a geomagnetic sensor, and an acceleration sensor. The microphone 1708 converts sounds that are inputted to the smart phone 1700 to audio signals. The input device 1709 includes, for example, a touch sensor configured to detect touch onto a screen of the display device 1710, a keypad, a keyboard, a button, or a switch, and receive an operation or information inputted from a user. The display device 1710 includes a screen (such as a liquid crystal display (LCD) and an organic light-emitting diode (OLED) display), and displays an output image of the smart phone 1700. The speaker 1711 converts audio signals that are outputted from the smart phone 1700 to sounds.

The wireless communication interface 1712 supports any cellular communication scheme (such as LTE and LTE-Advanced), and performs wireless communication. The wireless communication interface 1712 may typically include, for example, a BB processor 1713 and a RF circuit 1714. The BB processor 1713 may perform, for example, encoding/decoding, modulating/demodulating, and multiplexing/demultiplexing, and performs various types of signal processing for wireless communication. Meanwhile, the RF circuit 1714 may include, for example, a mixer, a filter, and an amplifier, and transmits and receives wireless signals via the antenna 1716. The wireless communication interface 1712 may be a chip module having the BB processor 1713 and the RF circuit 1714 integrated thereon. As shown in FIG. 17, the wireless communication interface 1712 may include multiple BB processors 1713 and multiple RF circuits 1714. Although FIG. 17 shows the example in which the wireless communication interface 1712 includes the multiple BB processors 1713 and the multiple RF circuits 1714, the wireless communication interface 1712 may also include a single BB processor 1713 or a single RF circuit 1714.

Further, in addition to a cellular communication scheme, the wireless communication interface 1712 may support another type of wireless communication scheme such as a short-distance wireless communication scheme, a near field communication scheme, and a wireless local area network (LAN) scheme. In this case, the wireless communication interface 1712 may include the BB processor 1713 and the RF circuit 1714 for each wireless communication scheme.

Each of the antenna switches 1715 switches connection destinations of the antennas 1716 among multiple circuits (such as circuits for different wireless communication schemes) included in the wireless communication interface 1712.

Each of the antennas 1716 includes a single or multiple antenna elements (such as multiple antenna elements included in an MIMO antenna), and is used for the wireless communication interface 1712 to transmit and receive wireless signals. As shown in FIG. 17, the smart phone 1700 may include the multiple antennas 1716. Although FIG. 17 shows the example in which the smart phone 1700 includes the multiple antennas 1716, the smart phone 1700 may also include a single antenna 1716.

Further, the smart phone 1700 may include the antenna 1716 for each wireless communication scheme. In this case, the antenna switches 1715 may be omitted from the configuration of the smart phone 1700.

The bus 1717 connects the processor 1701, the memory 1702, the storage 1703, the external connection interface 1704, the camera 1706, the sensor 1707, the microphone 1708, the input device 1709, the display device 1710, the speaker 1711, the wireless communication interface 1712, and the auxiliary controller 1719 to each other. The battery 1718 supplies power to blocks of the smart phone 1700 shown in FIG. 17 via feeder lines that are partially shown as dashed lines in the FIG. 17. The auxiliary controller 1719 operates a minimum necessary function of the smart phone 1700, for example, in a sleep mode.

In the smart phone 1700 shown in FIG. 17, the processing circuit 510 described with reference to FIG. 5 and the processing circuit 910 described with reference to FIG. 9 may be implemented by the processor 1701 or the auxiliary controller 1719. At least a part of functions may be implemented by the processor 1701 or the secondary controller 1719. For example, the processor 1701 or the auxiliary controller 1719 may perform the function of saving SPS configuration by executing the instructions stored in the memory 1702 or the storage 1703.

Second Application Example

Figure 18:
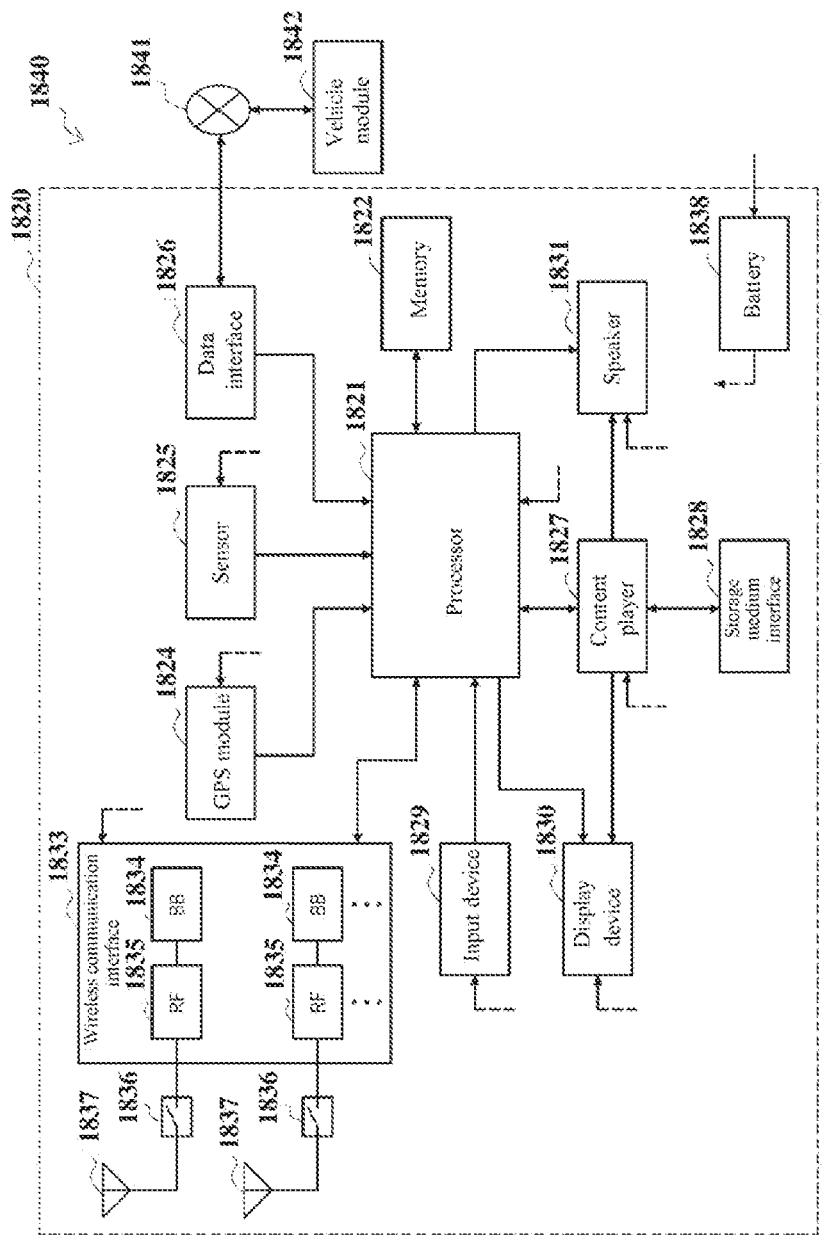
FIG. 18 is a block diagram showing a schematic configuration example of a car navigation apparatus.

FIG. 18 is a block diagram showing a schematic configuration example of a car navigation apparatus 1820 to which the technology of the present disclosure may be applied. The car navigation apparatus 1820 includes a processor 1821, a memory 1822, a global positioning system (GPS) module 1824, a sensor 1825, a data interface 1826, a content player 1827, a storage medium interface 1828, an input device 1829, a display device 1830, a speaker 1831, a wireless communication interface 1833, one or more antenna switches 1836, one or more antennas 1837, and a battery 1838.

The processor 1821 may be, for example, a CPU or a SoC, and controls a navigation function and another function of the car navigation apparatus 1820. The memory 1822 includes a RAM and a ROM, and stores a program executed by the processor 1821 and data.

The GPS module 1824 determines a position (such as latitude, longitude, and altitude) of the car navigation apparatus 1820 by using GPS signals received from a GPS satellite. The sensor 1825 may include a group of sensors such as a gyro sensor, a geomagnetic sensor, and an air pressure sensor. The data interface 1826 is connected to, for example, an in-vehicle network 1841 via a terminal that is not shown, and acquires data (such as vehicle speed data) generated by the vehicle.

The content player 1827 reproduces content stored in a storage medium (such as a CD and a DVD) that is inserted into the storage medium interface 1828. The input device 1829 includes, for example, a touch sensor configured to detect touch onto a screen of the display device 1830, a button or a switch, and receives an operation or information inputted from a user. The display device 1830 includes a screen such as a LCD or an OLED display, and displays an image of the navigation function or content that is reproduced. The speaker 1831 outputs sounds of the navigation function or the content that is reproduced.

The wireless communication interface 1833 supports any cellular communication scheme (such as LIE and LTE-Advanced), and performs wireless communication. The wireless communication interface 1833 may typically include, for example, a BB processor 1834 and an RF circuit 1835. The BB processor 1834 may perform, for example, encoding/decoding, modulating/demodulating, and multiplexing/demultiplexing, and performs various types of signal processing for wireless communication. Meanwhile, the RF circuit 1835 may include, for example, a mixer, a filter, and an amplifier, and transmits and receives wireless signals via the antenna 1837. The wireless communication interface 1833 may also be a chip module having the BB processor 1834 and the RF circuit 1835 integrated thereon. As shown in FIG. 18, the wireless communication interface 1833 may include the multiple BB processors 1834 and the multiple RF circuits 1835. Although FIG. 18 shows the example in which the wireless communication interface 1833 includes the multiple BB processors 1834 and the multiple RF circuits 1835, the wireless communication interface 1833 may also include a single BB processor 1834 or a single RE circuit 1835.

Further, in addition to the cellular communication scheme, the wireless communication interface 1833 may support another type of wireless communication scheme such as a short-distance wireless communication scheme, a near field communication scheme, and a wireless LAN scheme. In this case, the wireless communication interface 1833 may include the BB processor 1834 and the RF circuit 1835 for each wireless communication scheme.

Each of the antenna switches 1836 switches connection destinations of the antennas 1837 among multiple circuits (such as circuits for different wireless communication schemes) included in the wireless communication interface 1833.

Each of the antennas 1837 includes a single or multiple antenna elements (such as multiple antenna elements included in an MIMO antenna), and is used for the wireless communication interface 1833 to transmit and receive wireless signals. As shown in FIG. 18, the car navigation apparatus 1820 may include the multiple antennas 1837. Although FIG. 18 shows the example in which the car navigation apparatus 1820 includes the multiple antennas 1837, the car navigation apparatus 1820 may also include a single antenna 1837.

Further, the car navigation apparatus 1820 may include the antenna 1837 for each wireless communication scheme. In this case, the antenna switches 1836 may be omitted from the configuration of the car navigation apparatus 1820.

The battery 1838 supplies power to blocks of the car navigation apparatus 1820 shown in FIG. 18 via feeder lines that are partially shown as dashed lines in the FIG. 18. The battery 1838 accumulates power supplied form the vehicle.

In the car navigation apparatus 1820 shown in FIG. 18, the processing circuit 510 described with reference to FIG. 5 and the processing circuit 910 described with reference to FIG. 9 may be implemented by the processor 1821. At least a part of functions may be implemented by the processor 1821. For example, the processor 1821 may perform the function of saving a SPS configuration by executing the instructions stored in the memory 1822.

The technology of the present disclosure may also be implemented as an in-vehicle system (or a vehicle) 1840 including one or more blocks of the car navigation apparatus 1820, the in-vehicle network 1841 and a vehicle module 1842. The vehicle module 1842 generates vehicle data (such as a vehicle speed, an engine speed or failure information), and outputs the generated data to the in-vehicle network 1841.

In the systems and methods of the present disclosure, it is apparent that the components or steps may be decomposed and/or recombined. These decompositions and/or recombinations should be considered as equivalent solutions of the present disclosure. Further, steps of performing the above series of processing may naturally be performed in chronological order as described above but is not limited thereto. Some of the steps may be performed in parallel or independently with each other.

While the embodiments of the present disclosure have been described in detail with reference to the drawings, it should be understood that the above-described embodiments are merely used to illustrate the present disclosure and are not intended to limit the present disclosure. For those skilled in the art, various modifications and variations may be made to the above-described embodiments without departing from the essence and scope of the present disclosure. Accordingly, the scope of the present disclosure is defined only by the appended claims and equivalents thereof.

The invention claimed is:

1. An electronic equipment, comprising: a processing circuit configured: to perform a Semi-Persistent Scheduling SPS configuration for a remote equipment, the remote equipment communicating with the electronic equipment via a relay equipment within a service range of the electronic equipment;
to generate indication information for instructing the relay equipment to save the SPS configuration information of the remote equipment and to forward the SPS configuration information to the remote equipment;
to generate identification information of the remote equipment to which the SPS configuration information is pertinent;
to include the identification information of the remote equipment in the SPS configuration information of the remote equipment; and
to generate activation information for activating the SPS configuration of the remote equipment; and
a transceiver circuit configured to transmit SPS configuration information of the remote equipment, and the indication information, and the activation information to the relay equipment,
wherein the processing circuit generates the activation information by scrambling Downlink Control Information DCI using the identification information of the remote equipment,
wherein the processing circuit is further configured to generate confirmation information for confirming a target remote equipment of the activation information, and
wherein the transceiver circuit is further configured to transmit the confirmation information to the relay equipment.

2. The electronic equipment according to claim 1, wherein the transceiver circuit is configured to transmit the SPS configuration information of the remote equipment to the relay equipment via high layer signaling.

3. The electronic equipment according to claim 1, wherein the processing circuit is further configured to generate indication information for indicating whether a target terminal of the SPS configuration information of the remote equipment is the relay equipment, and the transceiver circuit is further configured to transmit the indication information to the relay equipment.

4. The electronic equipment according to claim 1, wherein the transceiver circuit is configured to transmit the activation information to the relay equipment via low layer signaling.

5. An electronic equipment, comprising:
a transceiver circuit configured to:
receive Semi-Persistent Scheduling SPS configuration information of a remote equipment from a network side equipment providing service for the electronic equipment, the remote equipment communicating with the network side equipment via the electronic equipment, the SPS configuration information including identification information of the remote equipment to which the SPS configuration information is pertinent; and
receive indication information with instructions to save the SPS configuration information of the remote equipment and to forward the SPS configuration information to the remote equipment;
receive first activation information, from the network side equipment, generated by scrambling Downlink Control Information DCI using the identification information of the remote equipment for activating the SPS configuration of the remote equipment; and
receive confirmation information, from the remote equipment, for confirming the remote equipment of the first activation information; and
a processing circuit configured to: save the SPS configuration information; and
control the transceiver circuit to transmit the SPS configuration information to the remote equipment.

6. The electronic equipment according to claim 5, wherein the transceiver circuit is configured to receive the SPS configuration information of the remote equipment via high layer signaling, and wherein the SPS configuration information includes identification information of the remote equipment to which the SPS configuration information is pertinent.

7. The electronic equipment according to claim 5, wherein the transceiver circuit is further configured to receive, from the network side equipment, indication information for indicating whether a target terminal of the SPS configuration information is the electronic equipment.

8. The electronic equipment according to claim 5, wherein the transceiver circuit is further configured to receive, from the network side equipment, first activation information for activating the SPS configuration of the remote equipment, and
wherein the transceiver circuit is configured to receive the first activation information via low layer signaling.

9. The electronic equipment according to claim 8, wherein the processing circuit is further configured to descramble the first activation information using the identification information of the remote equipment, and
wherein the processing circuit is further configured to generate second activation information for activating the SPS configuration of the remote equipment, and the transceiver circuit is further configured to transmit the second activation information to the remote equipment.

10. The electronic equipment according to claim 9, wherein the transceiver circuit is configured to transmit the second activation information to the remote equipment via low layer signaling,
wherein the processing circuit generates the second activation information by scrambling Sidelink Control Information SCI using the identification information of the remote equipment, and
wherein the processing circuit is further configured to generate confirmation information for confirming a target remote equipment of the second activation information, and the transceiver circuit is further configured to transmit the confirmation information to the remote equipment.

11. A wireless communication method performed by a relay equipment, comprising:
receiving Semi-Persistent Scheduling SPS configuration information of a remote equipment from a network side equipment providing service for the relay equipment, the remote equipment communicating with the network side equipment via the relay equipment, the SPS configuration information including identification information of the remote equipment to which the SPS configuration information is pertinent;
receiving indication information with instructions to save the SPS configuration information of the remote equipment and to forward the SPS configuration information to the remote equipment;
receive first activation information, from the network side equipment, generated by scrambling Downlink Control Information DCI using the identification information of the remote equipment for activating the SPS configuration of the remote equipment; and
receive confirmation information, from the remote equipment, for confirming the remote equipment of the first activation information;
saving the SPS configuration information; and
transmitting the SPS configuration information to the remote equipment.

12. A wireless communication method performed by an electronic equipment, comprising:
performing a Semi-Persistent Scheduling SPS configuration for a remote equipment, the remote equipment communicating with the electronic equipment via a relay equipment within a service range of the electronic equipment;
generating indication information for instructing the relay equipment to save the SPS configuration information of the remote equipment and to forward the SPS configuration information to the remote equipment;
including the identification information of the remote equipment in the SPS configuration information of the remote equipment;
generating activation information for activating the SPS configuration of the remote equipment by scrambling Downlink Control Information DCI using the identification information of the remote equipment; and
transmitting the SPS configuration information of the remote equipment, and the indication information, and the activation information to the relay equipment;
generating confirmation information for confirming a target remote equipment of the activation information; and
transmitting the confirmation information to the relay equipment.

* * * * *